United States Patent [19]

Eckart et al.

[11] Patent Number: 5,574,847
[45] Date of Patent: *Nov. 12, 1996

[54] COMPUTER GRAPHICS PARALLEL SYSTEM WITH TEMPORAL PRIORITY

[75] Inventors: Glen A. Eckart; William Armstrong, both of Salt Lake City, Utah

[73] Assignee: Evans & Sutherland Computer Corporation, Salt Lake City, Utah

[*] Notice: The portion of the term of this patent subsequent to Apr. 18, 2012, has been disclaimed.

[21] Appl. No.: 128,893

[22] Filed: Sep. 29, 1993

[51] Int. Cl.⁶ .................................................. G06F 15/16
[52] U.S. Cl. ............................................ 395/505; 395/510
[58] Field of Search ..................................... 395/121, 122, 395/126, 133, 134, 138, 139, 162–164, 800, 250, 325, 280, 284, 309, 310

[56] References Cited

U.S. PATENT DOCUMENTS

| | | | |
|---|---|---|---|
| 4,918,626 | 4/1990 | Watkins et al. | 395/134 |
| 4,949,280 | 8/1990 | Littlefield | 395/163 |
| 5,315,699 | 5/1994 | Imai et al. | 395/163 |
| 5,325,485 | 6/1994 | Hochmuth et al. | 395/163 |
| 5,459,835 | 10/1995 | Trevett | 395/163 |
| 5,465,368 | 11/1995 | Davidson et al. | 395/800 |

OTHER PUBLICATIONS

IEEE Computer Graphics and Applications, "Breaking the Frame Buffer Bottleneck with Logic Enhanced Memories", by Poulton et al, Nov. 1992. pp. 65–74.

*Primary Examiner*—Kee Mei Tung

[57] ABSTRACT

Front end processors in a graphics architecture execute parallel scan conversion and shading to process individually assigned primitive objects for providing update pixels. A crossbar along with groups of first-in-first-out registers (FIFOs) accommodates data flow to parallel pixel processors with associated memory capabilities (frame buffer banks) where visibility and blending operations are performed on predetermined sequences of update pixels to provide frame buffer pixels and ultimately display pixels. The pixel processors identify with sequences of pixels in the display in patterns designed to equalize processor loads for pixels located along scan lines of a raster, or distributed over an area. Update pixel data is tagged to identify FIFO groups (pixel processors) individual FIFO selection and output sequence. Temporal priority is accomplished so that primitive data is entered in the frame buffer banks (components) restored to the same order as generated at the central processor (CPU) level.

26 Claims, 13 Drawing Sheets

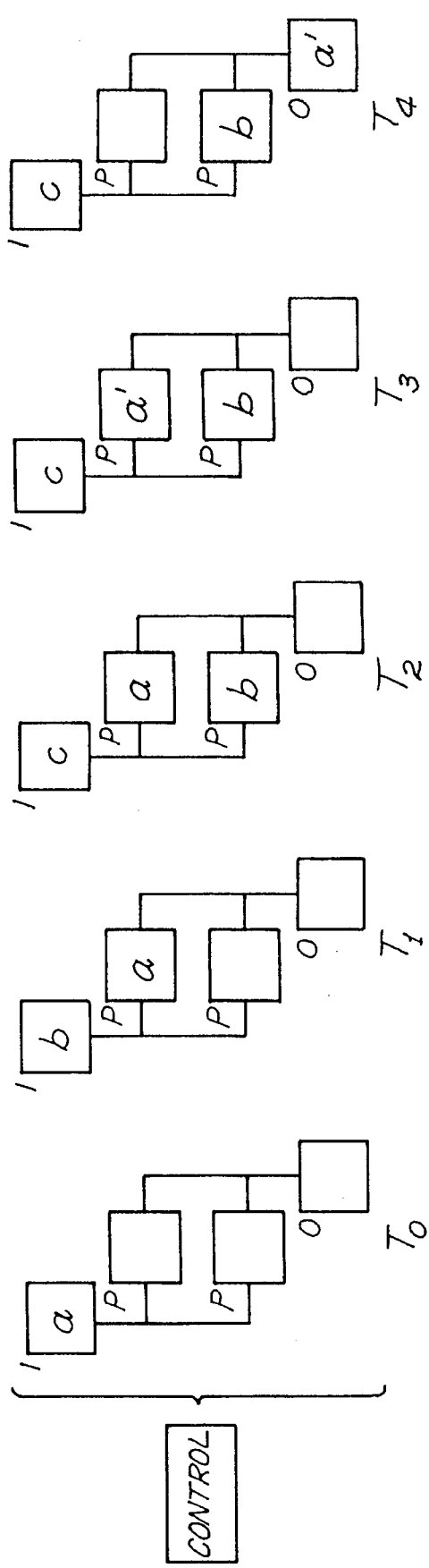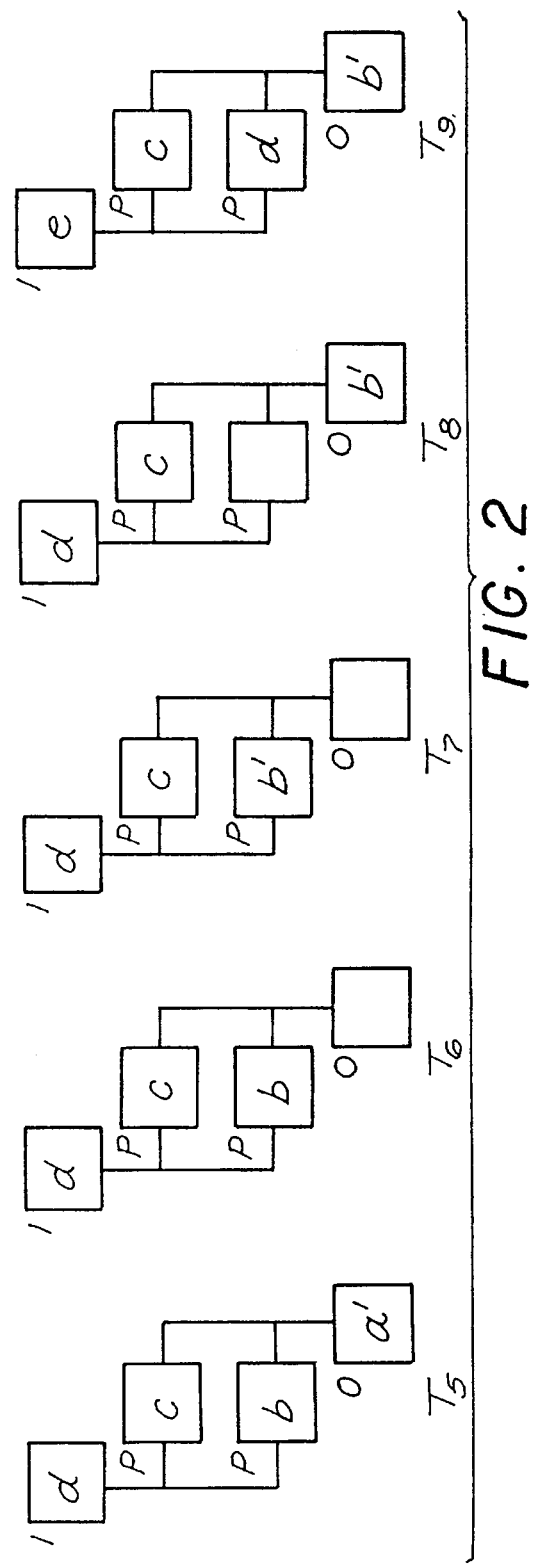
FIG. 2

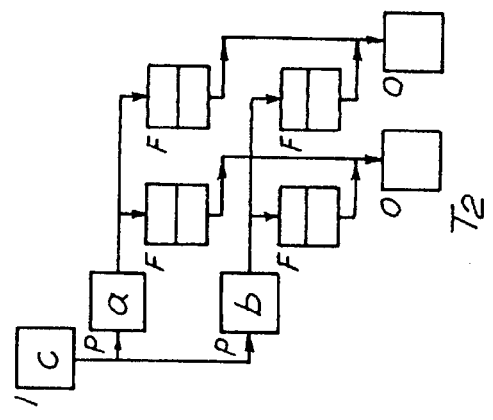
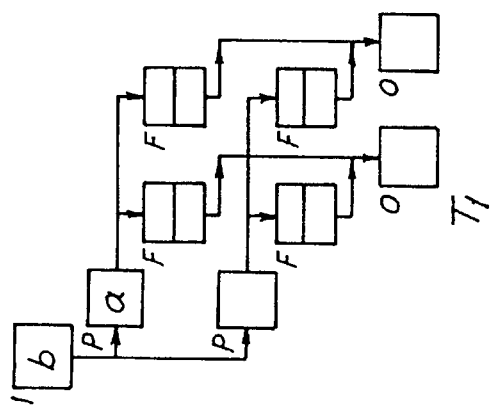
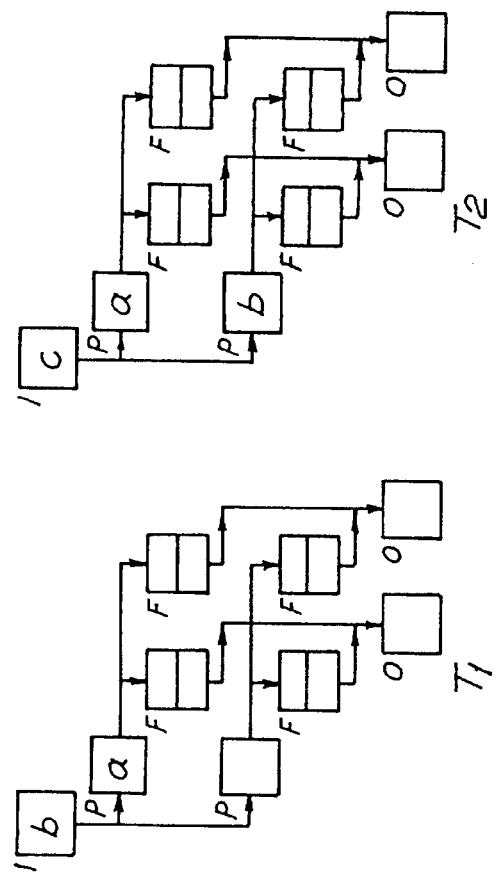
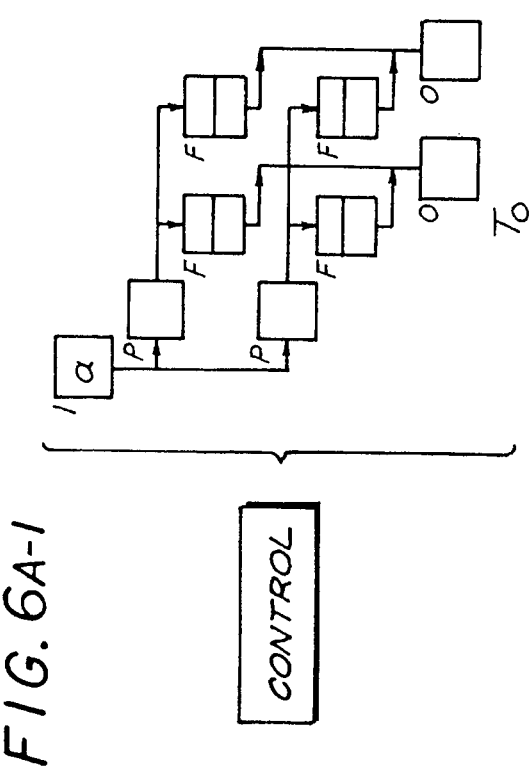
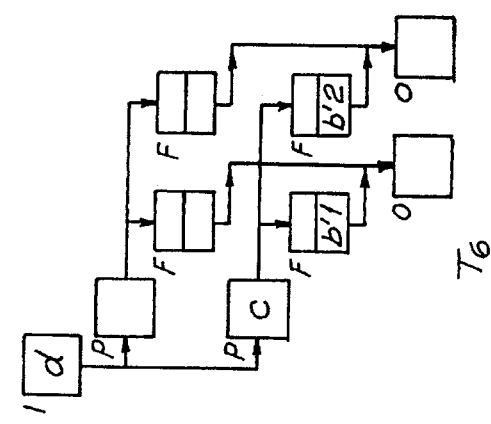
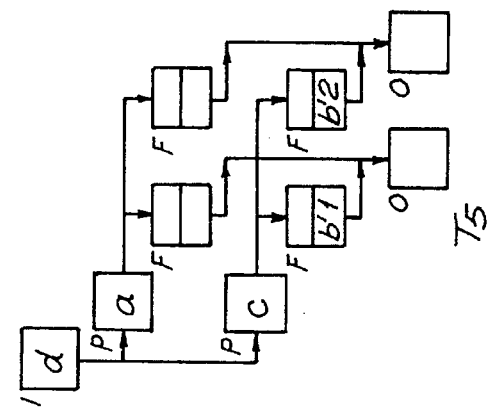
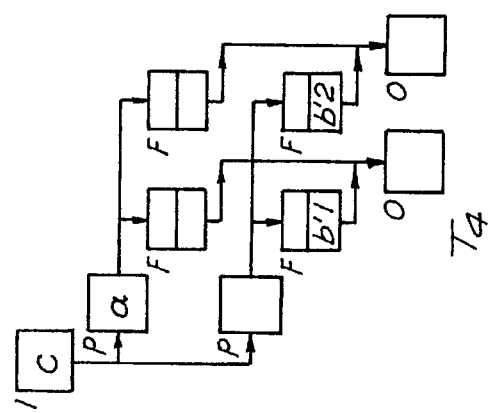
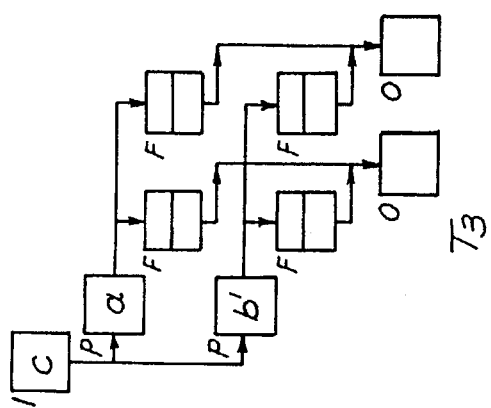
FIG. 6A-1

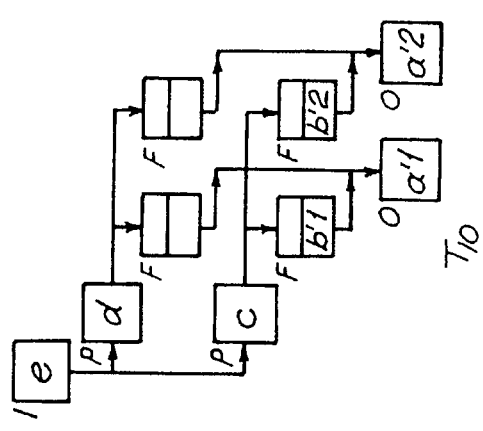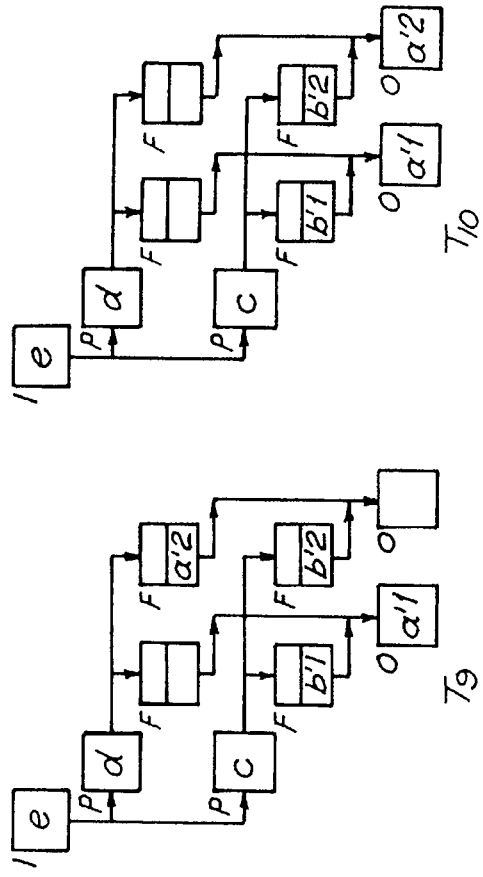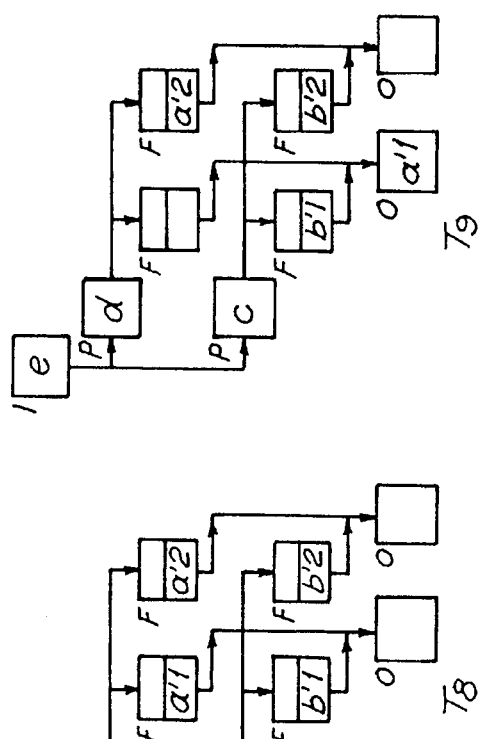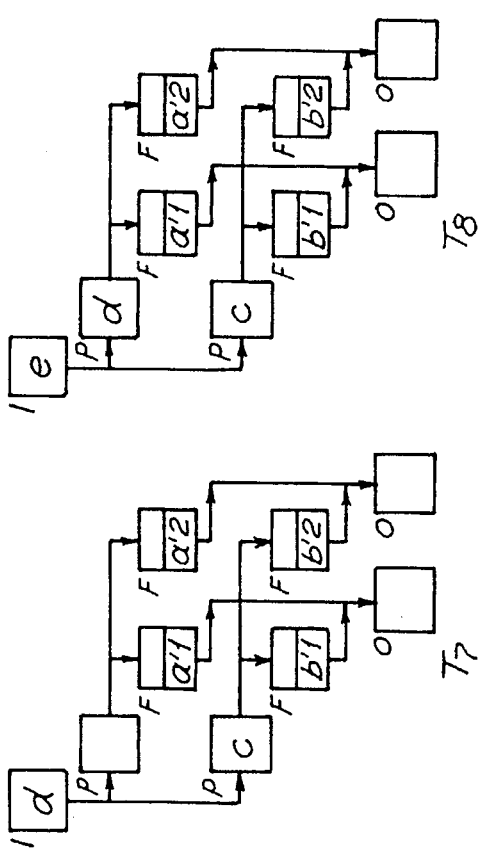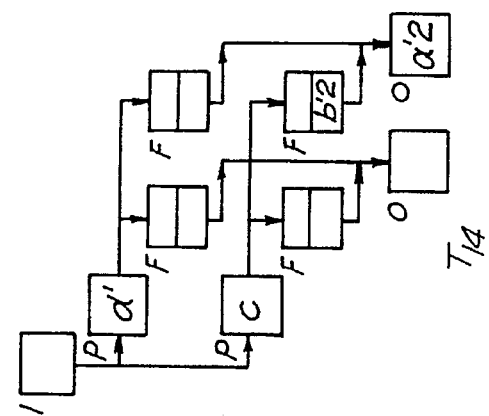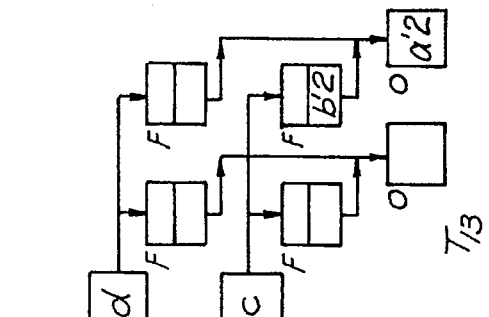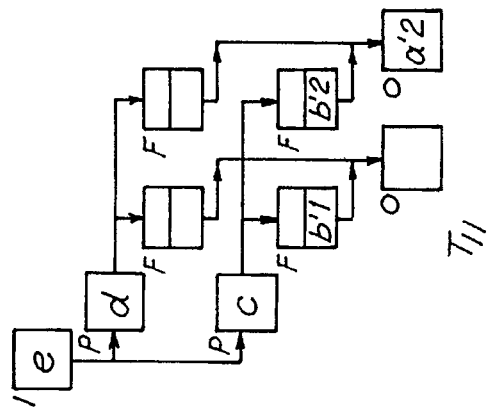
FIG. 6A-2

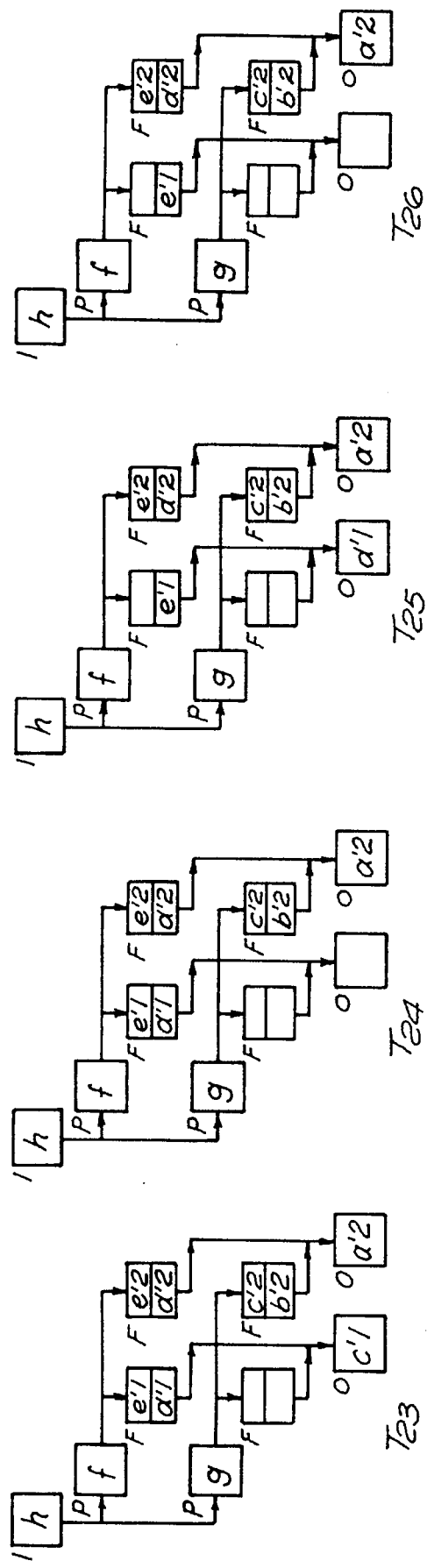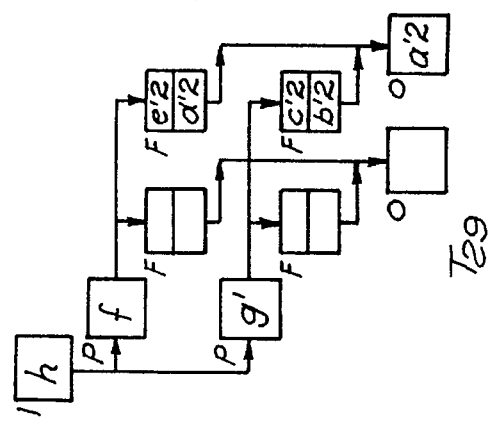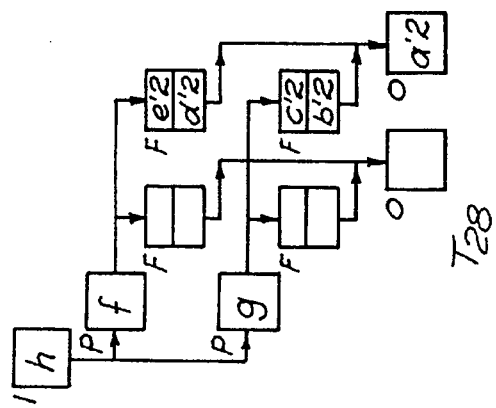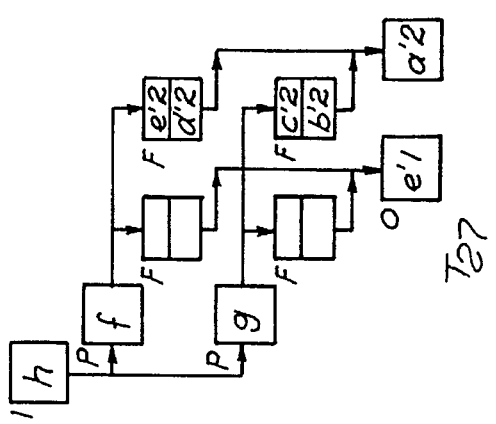
FIG. 6B-2

5,574,847

COMPUTER GRAPHICS PARALLEL SYSTEM WITH TEMPORAL PRIORITY

BACKGROUND AND SUMMARY OF THE INVENTION

1. Field of the Invention

The invention relates to data processor systems utilizing parallel processors in distinct phases of operations with restoring structures so that the time sequence of data groups are preserved or restored.

2. Prior Development Considerations

An aspect of current computers involves bundling data into packets, sets or groups and somewhat discretely processing the data so bundled. In general, the present development is based on recognizing the significance of the temporal priority of bundled data packets and preserving or restoring that priority, particularly as related to systems wherein processing operations for different data sets may vary.

In general, the disclosed embodiments take the form of parallel processor systems. As an example for discussing such systems in greater detail, a computer graphics system is treated below. Generally, some preliminary consideration of computer graphics systems is deemed appropriate.

Perhaps video games are the best known form of computer graphics systems. However, the technology involves a considerable number of other forms of display apparatus as for training, designing, modelling and so on. Typically these systems give the viewer the impression of looking at a television set, or through a window at a scene. In graphics terminology, the window is called a "viewport". The creation of a scene in a viewport from primitive object data involves several individual processing operations as generally well known in the art. That is, scenes are created in a viewport from primitive geometric or object data with respect to a specific viewpoint.

At the outset, a computer graphics system must traverse a data structure in a central processor and select the object data that is relevant to a scene. Primitive object data may embrace objects, polygons or lines. The selected object data for a scene is transformed into a convenient coordinate system where it can be compared to the viewport. Such comparison enables the data to be clipped so that those parts of objects that lie outside the viewport are cut away.

After the object data for a scene is defined for a specific viewpoint, it is scan converted, specifically it is changed from a set of vertices with connectivity information implying lines and surfaces, to a list of picture elements (pixels) that can be processed to depict lines and surfaces. In the iterative treatment of primitives (object data) cumulative frame buffer pixels (representing a picture) are stored in the frame buffer to be further supplemented or updated for dynamic displays by update pixels. In the initial operations, pixels also may be preliminarily shaded, specifically, color determinations are indicated.

In processing pixels, the visibility of object surfaces is determined for each pixel. Generally, only the closest surface to the viewer should be visible as represented by each pixel in a display. The most common algorithm used to omit hidden surfaces involves the so called "Z buffer". Each pixel is assigned a Z value that indicates the distance from a specific object surface location to a viewpoint. Essentially, Z values of the dissected surfaces are compared and of all the surface locations contending for presence in a pixel, the one that is closest to the viewpoint is stored in the frame buffer for the display. Data representing other surfaces is discarded. Numerous visibility algorithms exist, as for instance see U.S. Pat. No. 4,918,626, entitled *COMPUTER GRAPHICS PRIORITY SYSTEM WITH ANTIALIASING*, issued Apr. 17, 1990, to Gary S. Watkins, Glen A. Eckart and Russell A. Brown.

To improve the appearance of displays, another pixel processing operation involves blending pixels. That is, to avoid jagged lines or edges and accommodate transparency, the representations of two surfaces that contend for presence in a pixel are blended.

For the generation of a picture, frame buffer pixels are reformatted and provided in a raster pattern to drive a display unit, e.g. a cathode ray (CRT) apparatus. For a dynamic display, the frame buffer is cyclically updated or refreshed by blending update pixels with frame buffer pixels to reflect a changing scene.

The operations attendant the steps as explained above involve vast amounts of computation. For example, a scene may be composed from hundreds of thousands of polygons each of which must be processed with its presence reflected in individual display pixels. As is the case in much of the field of computer engineering, one trick to make computations run fast involves parallelism. In that regard, in various applications within the computer field, it has been proposed to variously partition computations among parallel processors. However, in computer graphics, partitioning computations for parallel operation presents certain difficulties. To be somewhat specific, data from a host computer relates to both primitives and state. Generally, primitives indicate what is to be drawn, while state indicates how things are to be drawn. State tends to be appropriate for a temporal series of primitives. Therefore, if the primitive order is changed, state is likely to be erroneously affected. Also, the order of primitives in and of themselves may be important.

The system of the present invention is based on recognizing the importance of preserving a time sequence, or temporal priority for data in computation as it passes through processors. Broadly, the system of the present invention is a processing system utilizing parallel processors with the preserved time sequence of data, that is, preserved or restored temporal priority.

SUMMARY OF THE INVENTION

It has been recognized that some processing, as for example graphics tasks in the generation of images, particularly two-dimensional processes, ultimately rely on primitives being written into a frame buffer in the temporal order of their generation at a CPU or host computer level. Such order or priority is likely to be lost in a highly parallelized multi-processor graphics system with serious impact on the processes relying on temporal order. In accordance herewith, a form of accounting is implemented to preserve or restore temporal priority after processing. In that regard, certain things have been recognized as significant. For example, tags or markers may be added to the data stream to enable re-establishing temporal priority. The markers may be considered as time stamps or "now-serving" tickets. Also, first-in-first-out registers (FIFOs) may be used to restore sequences.

Turning to the structural aspects in greater detail, the system of the present invention incorporates pluralities of processors operating in parallel at different stages to independently process data. As disclosed in a computer graphics embodiment, a front end set of primitive processors receive primitives in an orderly time sequence as they are generated. The primitive processors operate in parallel to transform, clip, scan convert and shade individual polygons, e.g. triangles, thereby producing an output stream of shaded update pixels.

A crossbar routing structure rearranges the streams of shaded update pixels to be further processed in parallel based on screen-space partitioning and on the time sequence implied in the primitive specification. For example, pixels are selectively applied to visibility-and-blend processors based on a partitioning of screen space. Accordingly, display or pixel processors are assigned on the basis of screen space partitioning and preserving temporal priority (time sequence of generation) also functioning in parallel to complete the processing. Criteria are described for partitioning or mapping between the pixel processors and the display.

Essentially, in the disclosed graphics embodiment, the front end parallel primitive processors operate with primitive independence, for example, a specific polygon is assigned to a specific processor. Each primitive processor transforms, clips, scan converts and shades a polygon to produce a sequence or stream of shaded update pixels. Temporal priority is preserved, for example by data tags and a group of FIFOs for each visibility-and-blend (pixel) processor. Assignments to those processors are based on screen-space partitioning. Thus, the processors each determine visibility and blend the result (frame buffer pixels) into a fragmented frame buffer. Essentially, the display processors reformat frame buffer pixels as display pixels for display in a raster pattern.

BRIEF DESCRIPTION OF THE DRAWINGS

In the drawings, which constitute a part of the specification, exemplary embodiments of the invention are set forth and illustrated as follows:

FIG. 2 is a block diagram of a two processor computer configuration shown sequentially to illustrate its contents at different instants of time;

FIG. 6A is a block diagram of a part of a two processor computer configuration with extended variable storage shown sequentially to illustrate its contents at different instants of time;

DESCRIPTION OF THE ILLUSTRATIVE EMBODIMENTS

As indicated above, illustrative embodiments of the present invention are disclosed herein. However, physical apparatus, data and partitioning formats and tags, as well as component systems in accordance with the present invention may be embodied in a wide variety of forms, some of which may be quite different from those disclosed herein. Consequently, the specific structural and functional details represented herein are merely representative; yet in that regard, they are deemed to afford the best embodiment for purposes of disclosure and to provide a basis for the claims herein which define the scope of the present invention.

Preliminary to considering more detailed embodiments, preliminary treatment will be given to systems input unit (I), processor (P) and output unit (O) in relation to the cyclic or iterative repeated calculations on consecutive sets or bundles of data. For simplicity of explanation, computer configurations are illustrated in time sequence from a time $T_0$ to a time $T_N$ and data packets or sets are represented by letter, e.g., a, b, c and so on. Processed sets of data are designated by a prime mark ('), for example, a' identifies the set of data a after a first level of processing. Specifics will now be treated.

Figure 1:
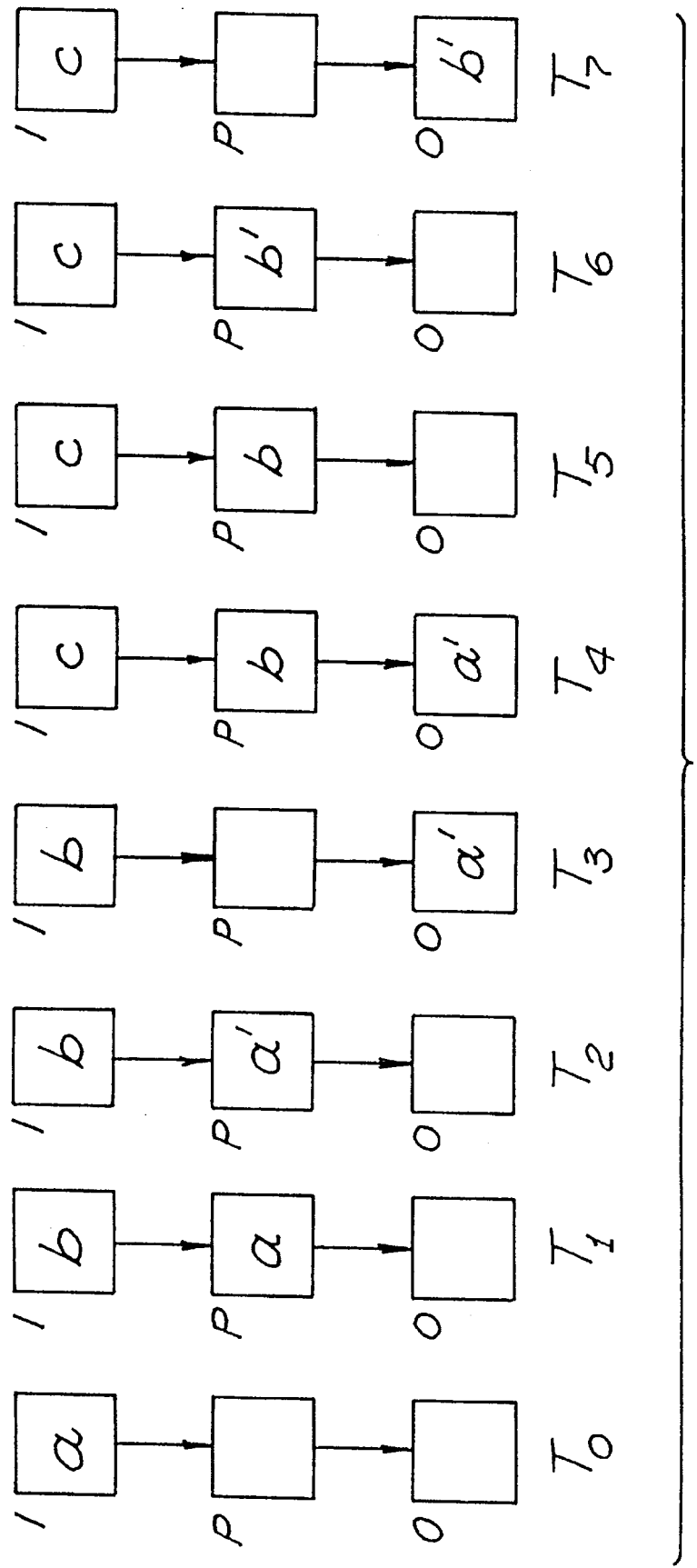
FIG. 1 is a block diagram of a simple processor of a computer configuration shown sequentially to illustrate its contents at different instants of time.

In FIG. 1 at time $T_0$, the input unit I has obtained the first set of data and has bundled it into a packet a, awaiting delivery to the processor P. At a time $T_1$, the processor P has received the packet a which is in calculation. The input unit I has obtained the next data set and formed into a packet b. At the time $T_2$, the processor P has completed its calculations and has formed a packet a' from the packet a. By the time $T_3$, the processor P has delivered packet a' to the output unit O. At the time $T_4$, the input unit I has delivered a packet b to the processor P and has obtained packet c. At the time $T_5$, the output unit O has delivered the packet a' and at the time $T_6$, the processor P has formed packet b'. Finally, by the time $T_7$, the processor P has transferred the packet b' to output unit O. Thus, the interrelationship of an input unit I, a processor P and an output unit O is introduced as treated in detail below.

Next, assume that the processing operation (processor P) requires more time than the operations of the input unit I or the output unit O. To accommodate the situation, as illustrated in FIG. 2, two similar processors P are connected in parallel between the input unit I and the output unit O. Consider the time-operation sequence.

At time $T_0$, the input unit I has obtained the first set of data and has bundled it into a packet a, awaiting delivery to one of the processors P. At time $T_1$, the upper processor has received packet a and has begun calculation. The input unit I has obtained the next set of data and has formed it into a packet b. At time $T_2$, the lower processor has received packet b and has begun calculation. The input unit I has obtained the next data set and formed it into a packet c.

By the time $T_3$, the upper processor P has completed its calculations, has formed packet a', and is ready to deliver the packet to the output unit O. At time $T_4$, packet a' has been delivered to the output unit O. By the time $T_5$, the upper processor P has received a packet c from the input unit I and has begun its calculations. The input unit has obtained the next data set and has formed it into a packet d.

By the time $T_6$, the output unit O has passed the packet a' from the system. By the time $T_7$, the lower processor has completed its calculations thereby forming a packet b', ready for delivery to the output unit O. At the time $T_8$, the packet b' has been delivered to the output unit O. Finally, at the time $T_9$, the lower processor has received a packet d from the input unit I and has begun its calculations. Thus, the processors P operate in parallel, generally accomplishing a time saving over the configuration as illustrated in FIG. 1.

As another complication, next assume that the processing operations required to form the data packet b' require less time than those required to form the data packet a'. Such a situation will now be treated with reference to FIG. 3, again with the utilization of parallel processors P.

Figure 3:
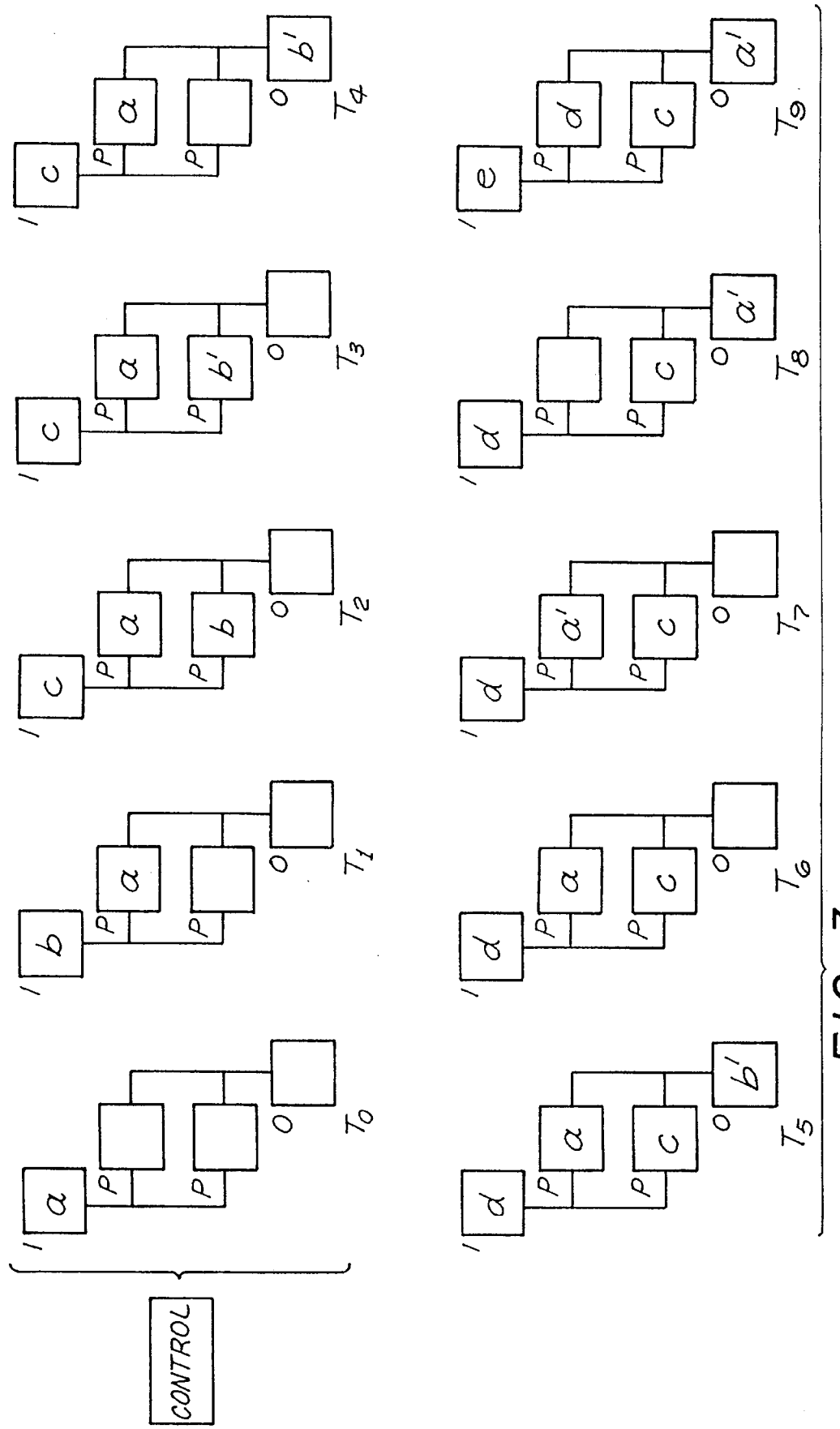
FIG. 3 is a block diagram of another computer configuration shown sequentially to illustrate its contents at different instants of time.

With reference to FIG. 3, at time $T_0$, the input unit I has obtained the first set of data, has bundled it into packet a and awaits to deliver it to a processor P. At time $T_1$, the upper processor P has received packet a and has begun its calculations. The input unit I has obtained the next data set and has formed it into packet b. By the time $T_2$, the lower processor has received packet b and has begun its calculations. The input unit I has obtained the next data set and has formed it into packet c. By the time $T_3$, the lower processor has completed its calculations, has formed packet b' and is ready to deliver b' to the output unit O. At time $T_4$, packet b' has been delivered to the output unit O. At time $T_5$, the lower processor has received packet c from the input unit I and has begun its calculations. The input unit I has obtained the next data set and has formed it into packet d. By the time $T_6$, the output unit O has output packet b' from the system. By the time $T_7$, the upper processor P has completed its calculations, has formed the packet a' and is ready to deliver a' to the output unit O. At time $T_8$, the packet a' has been delivered to the output unit O and by the time $T_9$, the upper processor P has received packet d from the input unit I and has begun its calculations.

In summary, FIG. 3 shows that the processors running in parallel with calculations consuming varying lengths of time may result in reversing the order or sequence for delivery of data packets, i.e., packets a and b. The packet a initially preceded the packet b; however, the packet b' emerged from the system prior to the packet a'. For some computational problems, it becomes important to preserve the order, i.e., temporal priority.

Figure 4:
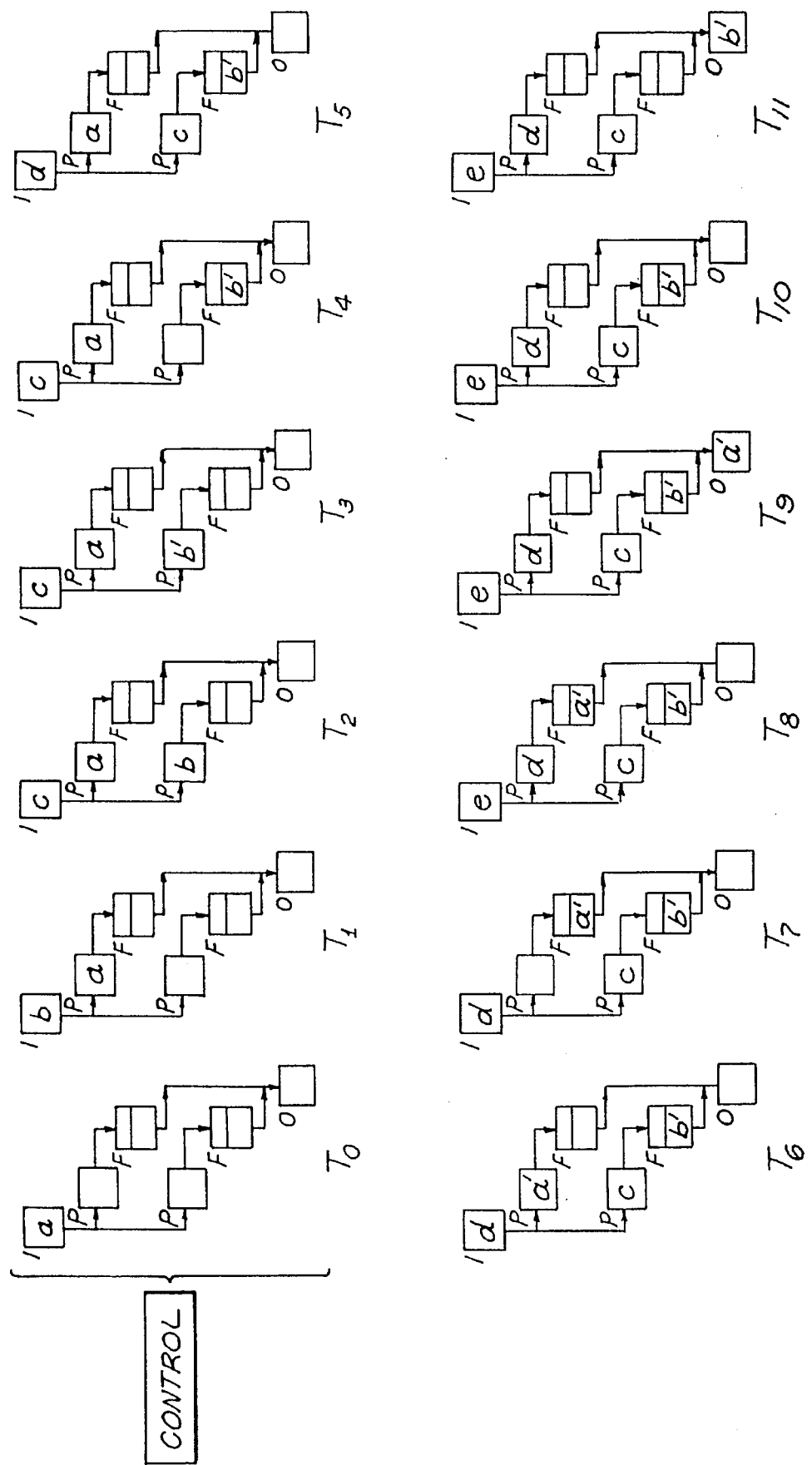
FIG. 4 is a block diagram of a two processor computer configuration with variable storage shown sequentially to illustrate its contents at different instants of time.

One manner of preserving order would be to have the lower processor P (FIG. 3) wait in transferring the packet b' to the output unit O until after the upper processor had transferred the packet a' to the output unit O. Unfortunately, such operation compels the lower processor P to be idle, wasting a computational resource. Alternatively, order could be preserved by adding first-in-first-out registers (FIFOs) between the processors and the output unit O. Such a configuration is illustrated in FIG. 4 with each FIFO designated F. Generally, FIFOs are well-known in the prior art for receiving data packets and delivering them on command in the order received.

In FIG. 4, at time $T_0$, the input unit I has obtained the first set of data, has bundled it into packet a and awaits delivery to the processor P. At time $T_1$, the upper processor P has received packet a and has begun its calculations. The input unit I has obtained the next data set and has formed it into packet b. At time $T_2$, the lower processor P has received packet b and has begun its calculations. The input unit I has obtained the next data set and formed it into packet c. By time $T_3$, the lower processor P has completed its calculations and has formed a packet b'. At time $T_4$, the packet b' has been delivered to the lower FIFO. By the time $T_5$, the lower processor P has received packet c from the input unit and has begun its calculations. The input unit has obtained the next data set and has formed it into packet d. By time $T_6$, the upper processor has completed its calculations to form packet a'. At time $T_7$, a' has been delivered to the upper FIFO. By the time $T_8$, the upper processor has received packet d from the input unit and has begun its calculations. The input unit has obtained the next data set and has formed it into a packet e. By time $T_9$, the output unit O has taken packet a' from the upper FIFO. By the time $T_{10}$, the output unit has output the packet a' from the system. Finally, by the time $T_{11}$, the output unit has taken b' from the lower FIFO.

In summary, FIG. 4 illustrates the processors P running in parallel and operating with FIFOs to provide the data packets in temporal order. The parallel processor operation can be completely utilized so long as the associated FIFOs have sufficient storage capacity.

Figure 5:
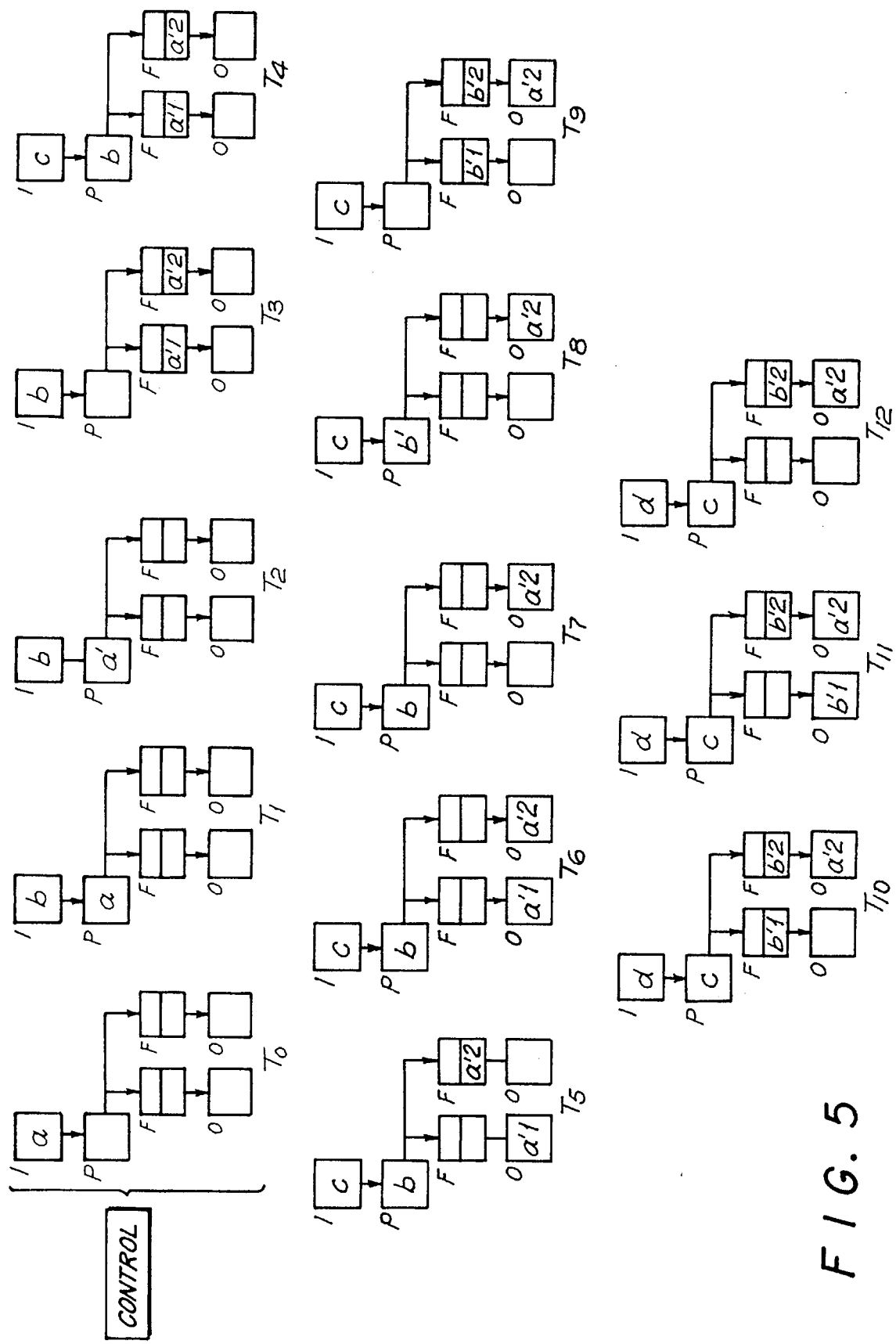
FIG. 5 is a block diagram of a single processor computer configuration with variable storage shown sequentially to illustrate its contents at different instants of time.

As an alternative to the situation in which the processing operation takes much longer than the input and output operations, consider the situation in which the output operation takes much longer than the input and processing, and further that a plurality of the output units O can be operated in parallel. FIG. 5 shows a system illustrating the situation.

Referring to FIG. 5, at time $T_0$, the input unit I has obtained the first set of data and has bundled it into packet a awaiting delivery to a processor P. By the time $T_1$, the processor has received packet a and has begun its calculations. The input unit I has obtained the next data set and has formed it into packet b. By time $T_2$, the processor has completed its calculations and has formed packet a'. By time $T_3$, appropriate parts of a' have been written into the FIFOs. Packet a'1 has been written into the left FIFO and packet a'2 has been written into the right FIFO. By time $T_4$, the processor has received packet b from the input unit and has begun its calculations. The input unit I has obtained the next data set and formed it into packet c. By time $T_5$, the left output unit has taken packet a'1 from the left FIFO. By time $T_6$, the right output unit has taken a'2 from the right FIFO. By time $T_7$, the left output unit has output packet a'1 from the system and by time $T_8$ the processor P has completed its calculations and has formed packet b'. At time $T_9$, appropriate parts of packet b' have been written into the FIFOS. That is, b'1 has been written into the left FIFO and packet b'2 has been written into the right FIFO. At time $T_{10}$, the processor P has received packet c from the input unit I and has begun its calculations. The input unit I has obtained the next data set and has formed it into packet d. By time $T_{11}$, the left output unit O has taken packet b'1 from the left FIFO. By time $T_{12}$, the left output unit O has output the packet b'1 from the system. If the time sequence were to continue, it would show the right output unit O delivering packets a'2 and b'2 from the system and the data packets c and d traversing through the system.

Summarizing with respect to FIG. 5, the output work is distributed over parallel units. Each FIFO isolates the corresponding output unit from the processor that provides it with data from other output units. In that regard, the output units O operate independently.

Next, suppose that the input operations are much faster than either the processing or output operations. Further, suppose the desire to combine the feature of parallel processors, order preservation, isolation and parallel output units, as illustrated in the combined FIGS. 6A and 6B.

In FIG. 6A, as illustrated at time $T_0$, the input unit I has a obtained the first set of data, has bundled it into a packet a and awaits delivery to a processor P. By time $T_1$, the upper processor P has received packet a and has begun its calculations. The input unit I has obtained the next data set and has formed it into packet b. By the time $T_2$, the lower processor P has received packet b and has begun its calculations. The input unit I has obtained the next set and has formed it into packet c. By time $T_3$, the lower processor has completed its calculations and has formed packet b'. At the time $T_4$, appropriate parts of b' have been written into the FIFOs. Specifically, packet b'1 has been written into the lower left FIFO and packet b'2 has been written into the lower right FIFO.

By the time $T_5$, the lower processor has received packet c and has begun its calculations. The input unit has obtained the next data set and has formed it into packet d. At time $T_6$, the upper processor P has completed its calculations and has formed packet a'. By the time $T_7$, appropriate parts of packet a' have been written into the FIFOs. Specifically, packet a'1 has been written into the upper left FIFO and packet a'2 has been written into the upper right FIFO.

By the time $T_8$, the upper processor has received packet d and has begun its calculations. The input unit I has obtained the next data set and has formed it into packet e. At time $T_9$, the left output unit O has taken packet a'1 from the upper left FIFO and by time $T_{10}$, the right output unit O has taken packet a'2 from the upper right FIFO. At time $T_{11}$, the left output unit has output the packet a'1 from the system and by the time $T_{12}$, the left output unit O has taken the packet b'1 from the lower left FIFO. By time $T_{13}$, the left output unit has output the packet b'1 from the system. By time $T_{14}$, the upper processor has completed its calculations and has formed packet d'.

Figures 1, 6B:
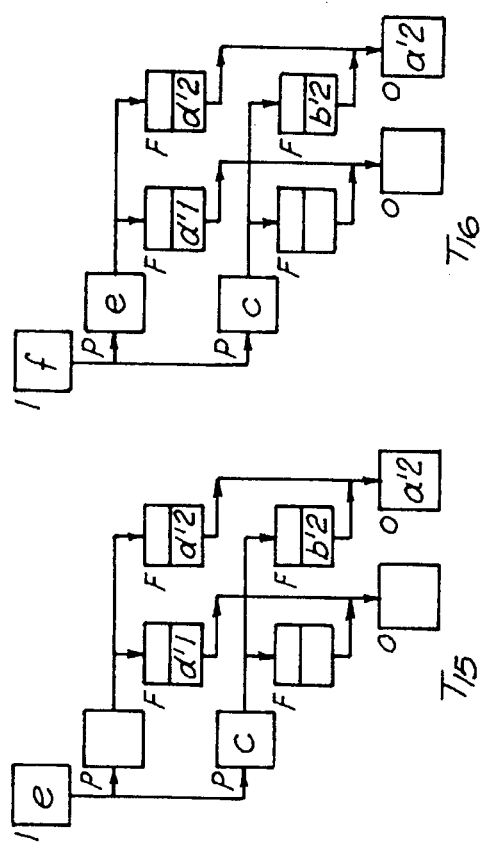
FIG. 6B is a block diagram of another part of a two processor computer configuration with extended variable storage.

As described to this point, FIG. 6A shows the processors P operating in parallel and isolation of the output units from the processors P and from each other. Below, the remainder of the description of the operation in FIG. 6B provides further examples of these features.

As illustrated in FIG. 6B, at time $T_{15}$, appropriate parts of packet d' have been written into the FIFOs. Specifically, packet d'1 has been written into the upper left FIFO and packet d'2 has been written into the upper right FIFO. By time $T_{16}$, the upper processor P has received packet e and has begun its calculations. The input unit I has obtained the next data set and has formed it into a packet f. By time $T_{17}$, the upper processor P has completed its calculations and has formed packet e'. By time $T_{18}$, appropriate parts of packet e' have been written into the FIFOs. Specifically, the packet e'1 has been written into upper left FIFO and the packet e'2 has been written into the upper right FIFO.

By time $T_{19}$, the upper processor has received packet f and has begun its calculations. The input unit has obtained the next data set and has formed it into packet g. At time $T_{20}$, the lower processor P has completed its calculation and has formed packet c'. At time $T_{21}$, appropriate parts of c' have been written into the FIFOs. Specifically, the packet c'1 has been written into the lower left FIFO and the packet c'2 has been written into the lower right FIFO.

At time $T_{22}$, the lower processor P has received packet g and has begun its calculations. The input unit I has obtained the next data set and has formed it into packet h. By time $T_{23}$, the left output unit O has taken packet c'1 from the lower left FIFO and by the time $T_{24}$, the left output unit O has output the packet c'1 from the system. At time $T_{25}$, the left output unit has taken the packet d'1 from the upper left FIFO. By the time $T_{26}$, the left output unit O has output packet d'1 from the system and by time $T_{27}$, the left output unit O has taken packet e'1 from the upper left FIFO. By time $T_{28}$, the left output unit O has output the packet e'1 from the system and by the time $T_{29}$, the lower processor has completed its calculations and formed packet g'.

At this point, the right FIFOs are full. The lower processor must wait until space becomes available in these FIFOs before it can deliver its results. Once the system backs up in this manner, it waits on the limiting element. In this case, the limiting element is the right output unit O. If the time sequence were to continue, it would show the right output unit O outputting packet a'2 from the system. Eventually, packets b'2, c'2, d'2 and e'2 in that order also would be provided from the system. In summary, FIG. 6 illustrates a system with parallel processors P and parallel output units O connected by FIFOs. The FIFOs make it possible for the processors and output units to operate with some independence and also make it possible to preserve the order of data that flows through the system.

Note that to this point, parallel processors P and parallel output units O have been represented by two structures. The arrangement was chosen to simplify the discussion and the figures. However, in general, there can be an arbitrary number N of processors and an arbitrary number M of output units.

The preceding several pages presented a simple view of temporal priority—the reestablishment of the time sequence or order of results—for a generic computer system composed of an input unit I, parallel processors P, FIFOs F, and parallel output units O. As presented above, the N-by-M array of FIFOs contributed functionalities including (1) storage needed for temporal priority reordering, (2) separation and isolation of processors from processors, processors from output units and output units from outputs units, and (3) connection of all processors to all output units. The remaining pages present an embodiment of temporal priority in a specific detailed computer system designed for computer graphics applications. As disclosed in the following pages, N-by-M FIFOs again provide storage for temporal priority reordering and separation and isolation of processors from processors, processors from output units and output units from outputs units. The functionality of connecting all processors to all output units is accomplished via a separate crossbar switch. The following paragraph starts the description of the computer graphics embodiment.

Considering the area of the selected embodiment, generally it is to be understood that within a computer graphics system, data structure usually is organized in some form of a tree or directed graph. That is, in the field of computer graphics, the root of the data structure may represent a scene. The hierarchy of the data structure follows the scene. Accordingly, primary branches hold gross scene features, modelling transforms and properties. Terminal branches hold basic primitives, such as triangles or lines. Such terminal branches or primitives inherit properties such as color, texture, orienting transformations and illumination for more primary branches near the root. Such operation allows the data structure to be succinct and relatively easy to update so as to modify a scene.

Figure 7:
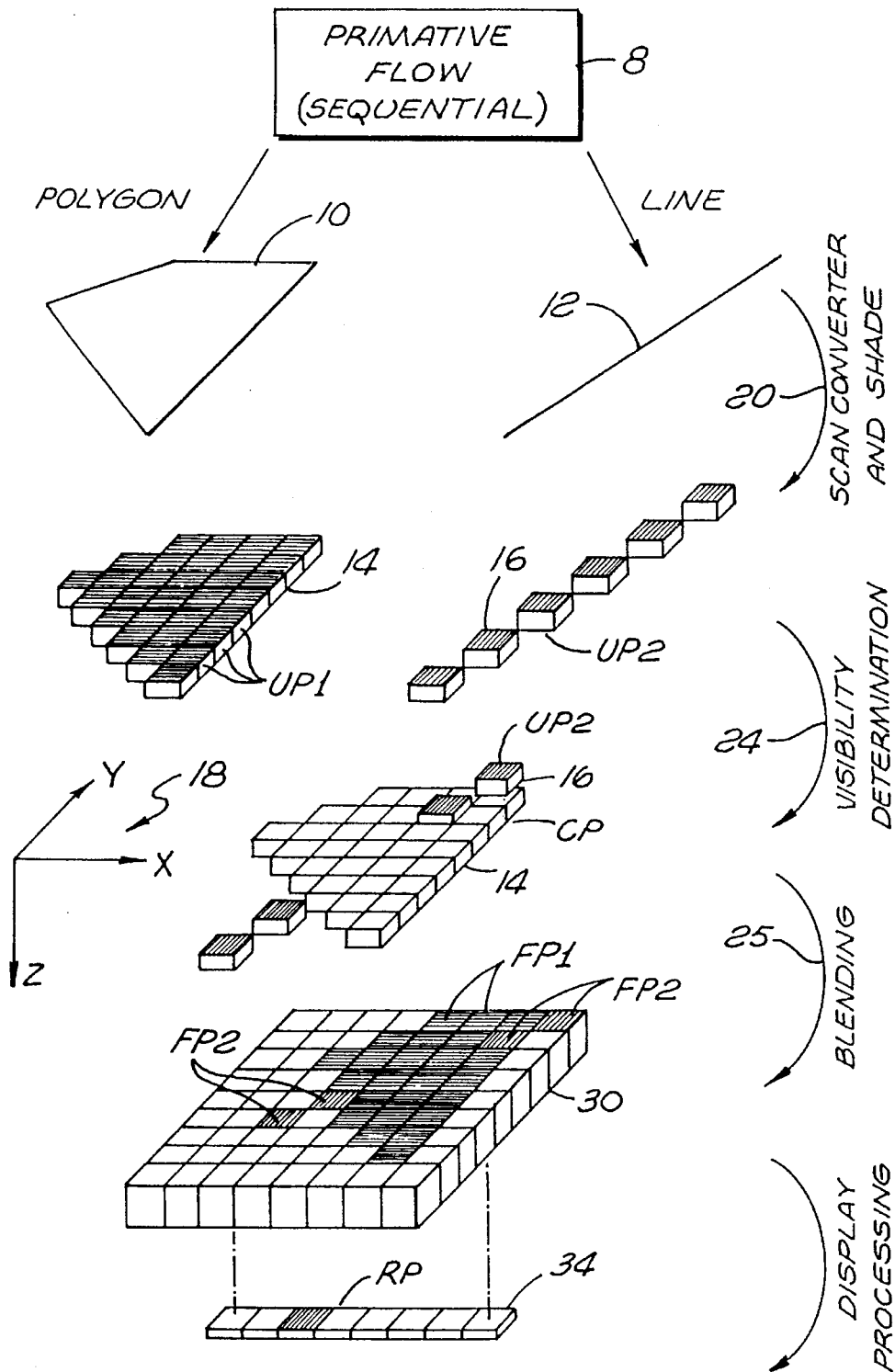
FIG. 7 is a graphic representation illustrating operations of the system as disclosed herein.

Typically, the data structure is traversed to identify primitives relevant to a scene along with their inherited transforms and properties. As represented in FIG. 7, the transversal may output a primitive flow as represented by a block 8. For example, the data may represent a sequence of primitives, as a polygon 10 following a line 12. As illustrated, the polygon 10 and the line 12 have been transformed, clipped and shaded in accordance with techniques well known in the art.

The next processing step involves scan conversion by primitive processors as illustrated by the arcuate arrow 20 (FIG. 7, right). Note that in order to accommodate the effective illustration of various operations, FIG. 1 is grossly out of proportion in relation to an actual monitor display. Specifically, individual pixels are illustrated as boxes, greatly enlarged in relation to a monitor display.

The scan conversion of the polygon 10 provides an array 14 of update pixels UP1 roughly coinciding in shape to the polygon 10. Similarly, the line 12 is scan converted to a representative row 16 of update pixels UP2. The term "update pixels" (UP) is employed to indicate that these quanta are commands to update the frame buffer pixels presently stored in the frame buffer as will be described in detail below. That is, in cyclic operations, update pixels are processed with reference to frame buffer pixels and the contents of the frame buffer is updated accordingly. For purposes of explanation, the pixels UP1 will be treated below as frame buffer pixels to be updated by the update pixels UP2.

As indicated above, the pixels UP1 and UP2 are represented by small boxes to suggest a three dimensional effect. In that regard, a small cube corner 18 (FIG. 1, center left) illustrates the three dimensional coordinate system. Specifically, the x axis is horizontal and positive to the right. The y axis is positive toward the upper right, intended to give the impression of a dimension that extends into the paper. The z axis is vertical and positive downwardly. With these axes, the pixels UP1 of the array 14 extend in x and y directions, but have a common z value (depth). The update pixels UP2 of the row 16 increment in the x and y dimensions and also decrement in the z dimension (depth), proceeding from left to right.

The pixels UP1 and UP2 are shaded to represent an indication of color that could vary from pixel to pixel. Accordingly, as indicated by the arcuate arrow 20 (FIG. 7, right) the change from the polygon 10 and the line 12 respectfully to the array 14 and the row 16 represents scan converting and shading. Such operations are traditionally performed by primitive processors as known in the art.

The next step in processing data for a display involves visibility determination as indicated by the arcuate arrow 24 (FIG. 7, right). For the involved pixel locations or positions in the display, pixels of the polygon 10 and the line 12 are compared to determine which is in front with reference to the viewer. The front pixel is determined as having a smaller z dimension value and accordingly, in case of an overlap, is indicated to block or obscure the rear pixel.

Referring to FIG. 7, the two right-most update pixels of the row 16 are above (lesser z value) the corresponding update pixels of the array 14. Accordingly, they will be visible in the pixel combination CP as illustrated.

Moving from right to left down the row 16, the third and fourth pixels UP2 will be concealed by pixels UP1 of the polygon 14. However, the last two pixels UP2 (left) are outside the perimeter of the array 14 and accordingly are visible. Thus, the pixel combination CP illustrates a short line (line 12) extending through a polygon (polygon 10) in piercing relationship.

The visibility determination step as described above is indicated by an arcuate arrow 24 (FIG. 7 right) and traditionally is performed by a pixel processor along with blending operations as will now be described. Specifically, the combination operation is performed by visibility and blend processors.

The blending operation, as represented by the arcuate arrow 25 involves blending and storing the final result in a frame buffer 30. For true blending, the resulting pixels end up being some intermediate color and brightness between the attributes of the blended starting pixels. However, within the limitations of black and white representation, shades of grays are employed to imply blending.

The frame buffer 30 (FIG. 7, bottom, illustrated as a single block) stores an array of frame buffer pixels, each being represented by a small cube. Note that the pixels in the frame buffer 30 are somewhat larger than the pixels UP1-UP2 to imply that more data is stored in the frame buffer pixels than the update pixels. In the frame buffer 30, the pixel combination CP is indicated by frame buffer pixels FP1 (representing the polygon 10) and pixels FP2 (representing the line 12).

In the operation of blending and storing as described above, it is to be understood that update pixels typically are considered with respect to the present contents of frame buffer pixels (e.g. old frame buffer pixels) and awards are made accordingly. Alternatively, as represented in FIG. 7, for purposes of simplicity it may be implied that the frame buffer was void of pixel representations and processing is between pixels UP1 and UP2.

The final step of rendering is to refresh a raster display based on the contents of the frame buffer 30. Traditionally, a display apparatus receives display pixels in a raster order, line by line, as represented by the row 34. Again, the row includes small cubes indicating display pixels RP. Representations of the display output pixels RP are more shallow than either the update pixels UP or the frame buffer pixels FP to imply that they contain less data. Essentially, the display pixels RP contain only the color and intensity information required to drive the display. The operation is executed by one or more display processors.

In general, the system of the present invention involves the processing operations as described above utilizing a form of parallelism. That is, the computations are partitioned among parallel processors. As disclosed below, primitives (polygons and lines) are processed in parallel on a one-to-one processor-to-primitive basis. Visibility and blending processors also operate in parallel and partitioning is based on screen space. Significantly, sequence disparity that may be introduced, for example by the parallel primitive processors, is rectified to preserve temporal priority.

Figure 8:
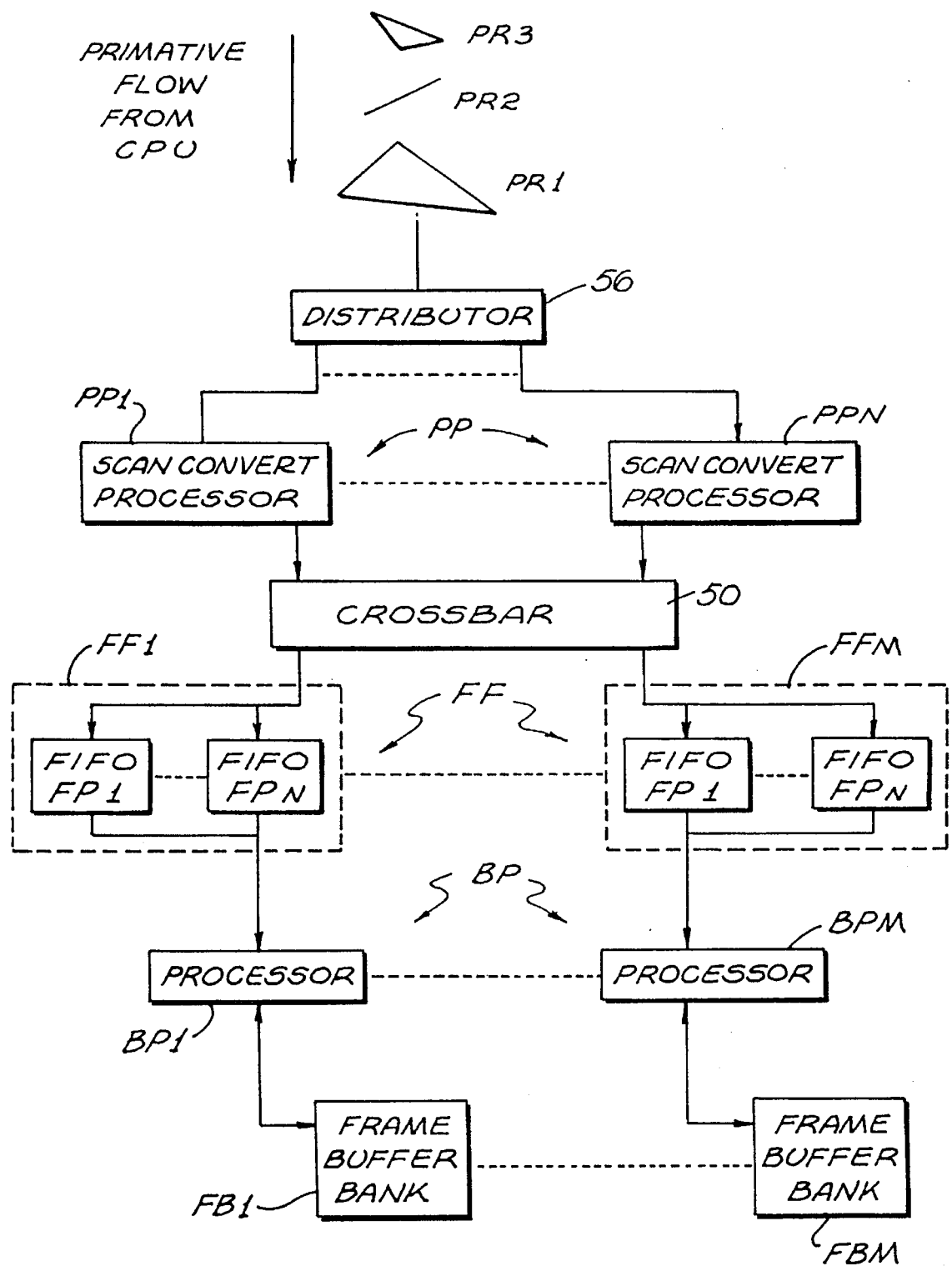
FIG. 8 is a block diagram of a system constructed in accordance with the present invention.

FIG. 8 illustrates the parallel partitioning of data with preserved temporal priority as executed by the disclosed embodiment. A parallel set PP (upper central) of primitive processors PP1-PPN and a parallel set BP (lower central) of visibility-blending processors BP1-BPM are illustrated. As suggested, the number of either primitive processors PP1-PPN or visibility-blending processors BP1-BPM may vary in any particular installation. Note that the numbers of processors in the sets PP and BP may or may not coincide but likely will not. Also, perhaps it is note-worthy that current trends suggest the use of increased numbers of parallel processors. For example, systems in accordance herewith may well employ tens of parallel processors.

The primitive processors PP1-PPN are connected by data paths through a crossbar 50 and a system FF of FIFOs to the processors BP1-BPM. Essentially, the crossbar 50 receives update pixels from the primitive processors PP1-PPN (segregated on one basis) and supplies such data selectively through the system FF to the visibility-blending (pixel) processors BP1-BPM. Generally, crossbar structures for such use are well known in the prior art as disclosed for example in a book, *High-Performance Computer Architecture*, by Harold S. Stone published in 1987 by Addison- Wesley Publishing Company, see the section beginning at page 305. Also, with regard to cross bars, see U.S. Pat. No. 4,807,183 entitled "Programmable Interconnection Chip for Computer System Functional Modules", Kung et al.

The system FF of FIFOs includes several FIFO groups FF1–FFM, each coupled between the crossbar 50 and one of the processors BP1–BPM. Each FIFO group FF1–FFM includes a number of individual FIFOs FP1–FPN coinciding to the number of primitive processors PP1–PPN. Temporal priority is restored by the controlled action of the FIFOs FP1–FPN in the FIFO groups FF1–FFM.

Each of the FIFOs FP1–FPN may be structurally similar, taking a well known form. For example, one form of basically acceptable FIFO is disclosed in U.S. Pat. No. 4,837,740 granted Jun. 6, 1989 to Ivan E. Sutherland.

Considering the data flow sequence, primitives PR1, PR2, PR3 - - - , and so on (FIG. 8, top) are provided from a host computer (not shown) to a distributor 56. Essentially, the distributor 56 supplies data representative of the primitives PR1–PRN to the processors PP1–PPN. In the distribution, complete primitives are given to each processor PP1–PPN.

As suggested above, each of the primitive processors PP1–PPN transforms, clips, scan converts and shades received primitives. As indicated above, such operations by each processor PP1–PPN are well known and understood as disclosed in a book, Computer Graphics: *Principles and Practice*, Second Edition, by Foley, Van Dan, Feiner and Hughes published in 1990 by Addison-Wesley Publishing Company, Inc., see section 18.3, Standard Graphics Pipeline beginning on page 866.

As a result of the operations performed by the primitive processors PP1–PPN, each processor provides a sequence or stream of shaded pixel data (update pixels) to the crossbar 50. Such operations are substantially independent as are the data streams provided to the crossbar 50. For example, the primitive processor PP1 might execute the specified operations on the primitive PR1 providing an independent sequence of upgrade pixels to the crossbar 50. Similarly, the primitive processor PPN might act on the primitive PR2. Note that the number of primitives always will grossly exceed the number of processors. Primitives are distributed to processors as the latter become available.

Essentially, the crossbar 50 receives update pixels intermingled from the primitive processors PP1–PPN, rearranges the update pixels and supplies different streams (based on screen space partitioning) to the FIFO system FF specifically designating individual FIFOs. For example, the FIFO FP1 in each of the FIFO groups FF1–FFM will receive the pixel data from primitive processor PP1. From the FIFOs, pixel data is provided to visibility-blending processors BP1–BPM with temporal priority restored.

The streams of pixel data supplied to the visibility-blending processors BP1–BPM are segregated on the basis of screen-space partitioning to equalize loads. For example, each of the visibility-blend processors BP1–BPM (pixel processors) may receive pixel data for predetermined pixel locations in the display array. Accordingly, each of the processors BP1–BPM independently determines visibility and blend, then stores the result in a component bank of the frame buffer FB1–FBM as described below.

There is no communication between the visibility-and-blend processors BP1–BPM rather, each processor communicates through a data path, independently with an associated frame buffer bank FB1–FBM to resolve visibility between update pixels and frame buffer pixels as well as to perform blending operations. Accordingly, as each pixel location is processed by a visibility-and-blend processor BP1–BPM, a determination is made with regard to visibility and blending. The result then is stored in a frame buffer bank FB1–FBM, the banks collectively holding fresh display data as described above.

Recapitulating to some extent, the two distinct forms of parallelism as described above involve the need for reapportioning pixel streams to the processors BP1–BPM. Specifically, update pixel streams flowing out of the primitive processors PP1–PPN are organized by primitive, that is, they are primitive coherent. However, update pixel streams flowing into the visibility and blending processors FP are to be organized by frame buffer address, that is, they are screen-space-coherent. The crossbar 50 matches the streams in that it inputs pixels from the primitive-coherent streams, sorts them and outputs them as screen-space coherent streams.

To further rearrange, the FIFO groups FF1–FFM selectively release data to the processors BP1–BPM, to restore temporal priority. In that regard, the update pixels are tagged to identify the processor (PP1–PPN) from which they came, and to indicate a temporal priority count, e.g. a "now-serving" count. Analogizing to a commercial retail operation where customers are asked to "take a number" during busy periods, the "now-serving" count restores pixel sequence somewhat in the same manner that temporal priority is preserved in serving retail customers in the order they entered the store.

Figure 9:
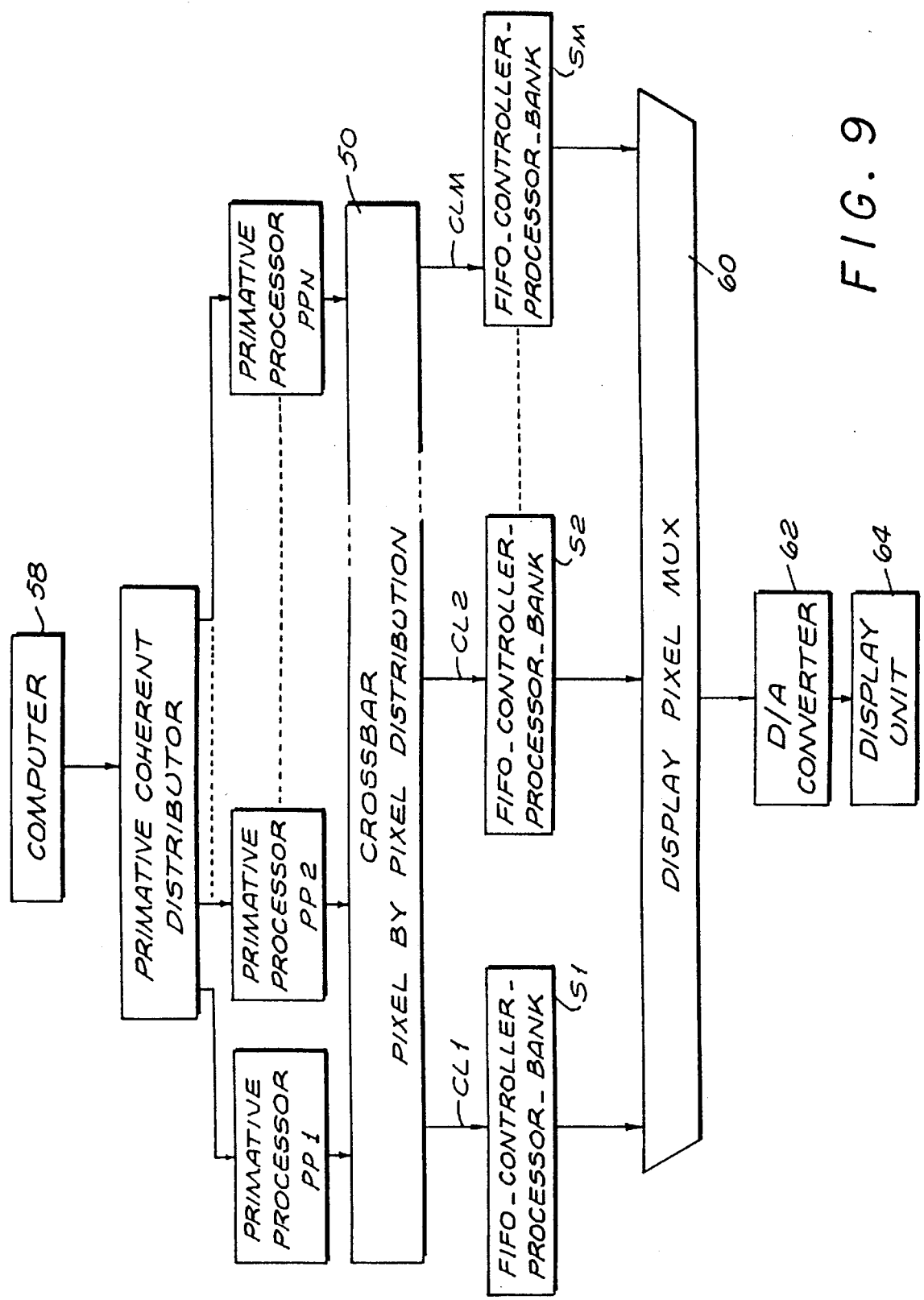
FIG. 9 is a more detailed block diagram of a system in accordance with the present invention.

Reference will now be made to FIG. 9 for a consideration of the overall system, after which the structure for preserving temporal priority will be treated in further detail. To some extent, previously identified drawing elements continue to bear the same identification designations.

The primitive processors PP1–PPN (FIG. 3, upper central) receive primitive coherent data through data paths and the distributor 56 from a host computer 58. Essentially, the computer 58 provides state data and definitive data for individual primitives that are passed to the processors PP1–PPN as the primitives become available. Also, the primitive coherent distributor 56 originates tag data for use in maintaining order, as disclosed in detail below.

The operation of the computer 58 is substantial, as described above, in that data is supplied for scan conversion and shading in the primitive processors PP1–PPN, which in turn supply sequences of update pixels to the crossbar 50 for rearrangement. However, note that with the independent operation of the processors PP1–PPN, the temporal sequence of the data from the computer 58 is altered. For example, if a very large polygon is given to one of the processors PP1–PPN while another processor PP1–PPN is given a series of short lines, pixels will be provided for the lines well ahead of the pixels representing the earlier large polygon. Temporal priority is reestablished by buffering the pixels in FIFO storage for select processing with regard to temporal priority. Thus, as indicated above, the operation can be analogized to a room full of customers in a retail establishment holding "now-serving" tickets to indicate and reestablish their original order.

In the operation of the system of FIG. 3, the structures S1–SM each include multiple FIFOs as described above. The assignment of individual update pixels to a specific one of the structures S1–SM is based on screen space apportionment to improve load distribution. However, the selection of a specific FIFO to provide an update pixel for processing is arranged to reestablish temporal priority.

To consider a specific processing example, an output stream of update pixels are distributed so that update pixels pass through one of the data lines CL1–CLM from the crossbar 50 to one of the structures S1–SM. The structures S1–SM reorder the update pixel data then perform visibility and blending operations as known in the art and as described for example in pending U.S. patent application Ser. No. 07/933,322, by Gary S. Watkins entitled *ATTRIBUTE BLENDING SYSTEM FOR COMPOSING COMPUTER GRAPHICS IMAGES FROM OBJECTS.*

The processed frame buffer pixels are stored in a frame buffer that is separated into banks that operate respectfully within the structures S1–SM. Thus, specific update pixels are processed by the structures S1–SM to develop fresh frame buffer pixels of the frame buffer banks. Outputs for display from the structures S1–SM is through data paths and a display pixel multiplexer (MUX) 60 to a D/A converter 62 and ultimately to a display unit 64.

Recapitulating to some extent, each of the structures S1–SM receive update pixels that are processed to provide updated frame buffer pixels in an associated frame buffer bank (component of the total frame buffer). When the composite frame buffer is fully refreshed (usually with the processing of many polygons) the data is supplied to the display pixel MUX 60 for delivery to the digital-analogue converter 62 in a raster sequence for driving the display unit 64.

Considering the overall operation of the system of FIG. 9, primitives are supplied from the computer 58 to the primitive coherent distributor 56 which may include a primitive bus for selective distribution in accordance with well known technology. In operation, the first available primitive processor P1–PN receives the next-in-line primitive from the distributor 56.

The specific primitive processor PP1–PPN receiving a primitive transforms, clips, scan converts and shades the primitive to provide a stream of primitive-coherent update pixels to the crossbar 50. From the crossbar 50, independent streams of update pixels are delivered to the structures S1–SM. The sequence reestablishment (temporal priority) is treated in greater detail below. However, first consider the assignments to individual structures S1–SM on the basis of display or screen space partitioning.

To consider a specific example, hypothetically, if pixel locations in screen space were assigned in a raster sequence by the designations: P1, P2, P3, P4, P5, P6, P7, - - - PN, beginning with the first pixel, first row, consider the resulting screen space distribution for five structures S1–SM. For such an arrangement, the structure S1 might process all pixel data for the pixel locations P1, P6, P11, P16 and so on. In the same arrangement, the structure S2 would be assigned the pixel processing for locations P2, P7, P12, and so on. The structure S3 would be assigned the pixel processing for locations P3, P8, P13, and so on. Thus, the exemplary parallel structures S1–SM would receive update pixel information on the basis of screen space partitioning, e.g. pixel display, raster location assignment. However, note that the order of data is reestablished by structures S1–SM. Preliminarily, some consideration next will be given to a manner in which the update pixel data stream may carry tags for restoring temporal priority.

Recapitulating, primitive data flow, defining individual primitives is provided from the computer 58 (FIG. 9) through the distributor 56 (FIGS. 8 and 9) to primitive processors PP1–PPN. The primitive processors then provide individual update pixels along with time tag data. Specifically, in the disclosed embodiment, the update pixels indicate a specific source processor PP1–PPN providing the pixel along with indexing count data. As indicated above, the update pixel data packets are somewhat collectively grouped in relation to state. With respect to state, "now-serving" tag count designations are provided at time displaced locations in the pixel data streams to define the grouping.

An exemplary data stream from the primitive processor PP1 may be represented as follows:

| Packet Type | Value | Source | Destination | Implicit Time Tag |
|---|---|---|---|---|
| Time tag | 47 | PP1 | all FFs | 47 |
| Update pixel |  | PP1 | FF15 | 47 |
| Update pixel |  | PP1 | FF2 | 47 |
| Update pixel |  | PP1 | FF1 | 47 |
| . | . | . | . | . |
| . | . | . | . | . |
| Update pixel |  | PP1 | FF15 | 47 |
| Update pixel |  | PP1 | FF4 | 47 |
| Update pixel |  | PP1 | FF7 | 47 |
| . | . | . | . | . |
| . | . | . | . | . |
| Time tag | 48 | PP1 | all FFs |  |
| Update pixel |  | PP1 | FF2 | 48 |
| Update pixel |  | PP1 | FF27 | 48 |
| . | . | . | . | . |
| . | . | . | . | . |

To indicate the operation somewhat conceptually (FIG. 8), a specific one of the FIFO groups FF1–FFM is selected depending on the location in the display for the update pixel data as indicated above. Thus, the pixel data selects one of the FIFO groups FF1–FFM to accomplish display partitioning and a more equitable load distribution for the processors BP1–BPM.

The selection of an individual FIFO FP1–FPN within each of the groups FF1–FFM to receive an update pixel is indicated by the processor PP1–PPN that formulated the pixel data. Accordingly, the update pixel packets provided from the crossbar 50 are tagged with the producing processor designation, e.g. PP1–PPN as indicated in the following chart. Assuming thirty-two primitive processors PP1–PP32, a similar number of FIFOs FP1–FP32 would be provided in each of the groups FF1–FFM. Tagged with an identification of the producing primitive processor, a similarly designated FIFO would receive the update pixel packet as an input.

| Packet Type | Source | Destination |
|---|---|---|
| Update pixel | PP16 | FP16 of FF1 |
| Update pixel | PP1 | FP1 of FF1 |
| Update pixel | PP13 | FP13 of FF1 |
| . | . | . |
| . | . | . |
| Update pixel | PP13 | FP13 of FF1 |
| Update pixel | PP7 | FP7 of FF1 |
| Update pixel | PP4 | FP4 of FF1 |
| . | . | . |
| . | . | . |

To consider an example in relation to the above chart, the represented pixel data is all destined for FIFO group FF1. The upper-most pixel data packet is designated to be placed in the FIFO FP16 of FIFO group FF1. The next pixel data packet would be received in the FIFO FP1 of FIFO group FF1. Thus, individual FIFOs are designated within each FIFO group.

A further consideration involves designating which of the FIFOs FP1–FPN in each of the FIFO groups FF1–FFM is to provide the output pixel data packet to the associated one of the processors BP1–BPM when ready. Generally, the selection is designated by the "now serving" count portion of the tag. That is, data packets are accepted by the processors BP1–BPM to maintain state in accordance with "now-serving" count designations, a component of the tag data. The selection is treated in greater detail below.

Figure 10:
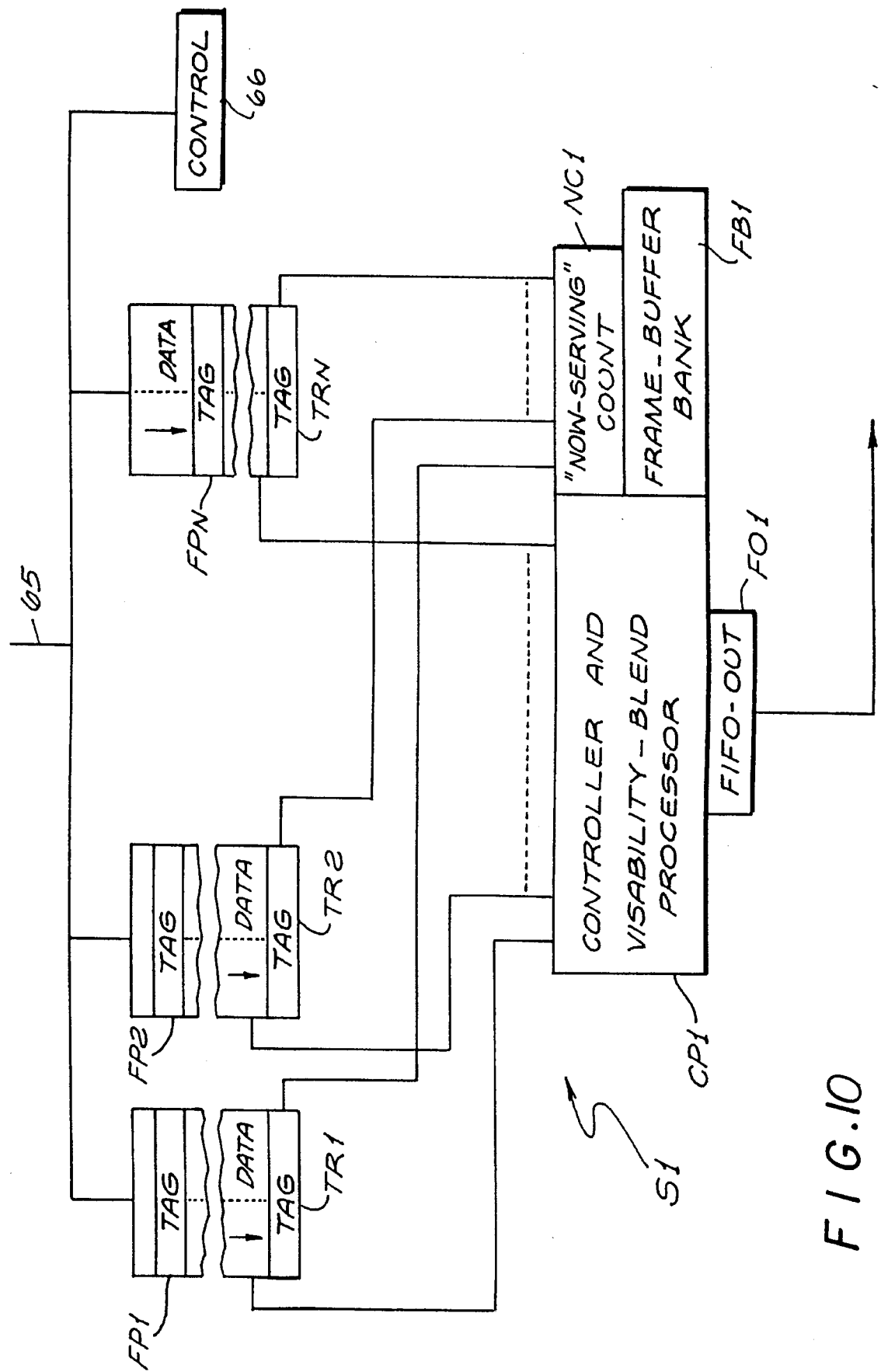
FIG. 10 is a detailed block diagram of a component of the system as shown in FIG. 9.

FIG. 10 illustrates the structure S1 (FIG. 9) in substantial detail. Generally, signals are received by the structure S1 through the crossbar 50 (FIG. 9) from each of the primitive processors PP1–PPN. The signals are received as indicated through path 65 (FIG. 10, top). Path 65 carries flows of update pixel packets and tag data packets immediately from crossbar 50 to FIFOs FP1–FPN. Controller 66 causes packets to be loaded into the FIFOs FP1–FPN that has the same numeral as the primitive processor PP1–PPN that generated the packet. As the data streams periodically include tag data, periodically such tag data appears at a tag register TR1–TRN for one of the FIFOs FP1–FPN. From the tag registers TR1–TRN, tag data is provided to a "now serving" counter NC1. In a similar fashion, pixel data is provided from the penultimate stage of the FIFOs FP1–FPN to the processor CP1.

The FIFOs FP1–FPN are connected to supply update pixel data to a controller and visibility-blend processor CP1 which functions in cooperation with a frame buffer bank FB1 to accomplish one component of the total frame buffer as explained above with reference to FIG. 8. Essentially, update pixels are received by the processor BP1 (FIG. 8) for visibility and blend processing along with old frame buffer pixels from the bank FB1. Such processing is repetitive with the bank FB1 ultimately containing pixels for display. At that time, the frame buffer pixels are provided from the bank FB1 through a FIFO FO1 (FIG. 10, output) to the display pixel MUX 60 (FIG. 9).

With the FIFOs FP1–FPN loaded, now consider the manner in which pixel data is selectively received by the processor BP1 (FIG. 8). Generally, such sequencing is accomplished by a "now-serving" counter NC1 (FIG. 10) functioning with the tag registers TR1–TRN. The "now-serving" counter NC1 is integral with the processor CP1 (FIG. 10) along with the frame buffer bank FB1 and the output FIFO FO1. Additionally, the "now-serving" counter NC1 is connected to each of the tag registers TR1–TRN. Essentially, the "now-serving" counter NC1 controls outputs from the FIFOs FP1–FPN through the tag registers TR1–TRN to provide pixel data to the processor S1 batched with regard to "now serving" tag numbers as indicated in the chart below. For example, all update pixel data with a count of 46 is received by the processor S1 before acceptance of any pixel data with a count 47. An operating sequence will now be considered in detail.

|  | FIFO FP1 |  | FIFO FP2 | ... |  | FIFO FPN |
|---|---|---|---|---|---|---|
| : | : | : | : |  | : | : |
| : | update pixel | : | update pixel | ... | : | update pixel |
| : | tag 49 | : | update pixel | ... | : | update pixel |
| : | update pixel | : | update pixel | ... | : | update pixel |
| : | update pixel | : | update pixel | ... | : | update pixel |
| : | update pixel | : | update pixel | ... | : | update pixel |
| : | update pixel | : | update pixel | ... | : | tag 51 |
| : | : | : | : | ... | : | : |
| : | update pixel | : | update pixel | ... | : | update pixel |
| : | update pixel | : | tag 50 | ... | : | update pixel |
| : | update pixel | : | *update pixel | ... | : | update pixel |
| : | update pixel | : | *update pixel | ... | : | update pixel |
| : | update pixel | : | *update pixel | ... | : | update pixel |
| TR1: | tag 47 | TR2: | tag 46 | ... | TRN: | tag 49 |

The chart above shows the contents of the last few locations of some of the FIFOs FP1–FPN (FIG. 10). These last few locations are locations nearest the output. The final location of each FIFO is a tag register TR1–TRN that holds the "now serving" count of the update pixels nearest to the output of the FIFO. For update pixels "now serving" counts are implied by position. For example, in FIFO FP2 the three update pixel packets nearest the output (indicated with an asterisk) all have a "now serving" count 46. After these three update pixels comes tag 50. The update pixels succeeding or above tag 50 all have "now serving" count 50. Tag register TR2 (associated with the FIFO FP2) is set at a count of 46. As a result, pixel data will be supplied from the FIFO FP2 (assuming none of the other tag registers TR1–TRN holds a lower value) to the processor CP1 (processor BP1, FIG. 8). Stated another way, pixel data is supplied in an orderly fashion from certain of the FIFOs FP1–FPN, the associated tag registers TR1–TRN of which hold the lowest "now-serving" value. In that regard, the "now-serving" counter NC1 is set with a current "now-serving" number with the consequence that pixel data is taken only from those FIFOs FP1–FPN whose associated tag register TR1–TRN coincides to the content of the counter NC1.

After the three pixels designated by the initial asterisk in the above chart are supplied to processor CP1, the tag register TR2 is advanced to tag value 50. Consequently, FIFO FP2 will no longer supply pixel data to the processor CP1 until the "now serving" counter NC1 is set to 50.

At a time when none of the tag registers TR1–TRN indicate a count of 46, the processor CP1 is prepared to advance accordingly. At such a time, the "now-serving" counter NC1 is advanced to the next count, e.g. count 47. Essentially, the advance to the next "now-serving" number occurs when processing of data related to the current number is complete. The conclusion is, move to 47 because there are no more 46 values. Processor CP1 updates "now-serving" counter NC1 independently of processors CP2–CPM and counters NC2–NCM. Because the work of these processors is partitioned in screen space, there is no need for them to be synchronized.

With the update pixels received in the processor CP1, visibility and blend processing is performed in association with the frame buffer bank FB1 as indicated above. Accordingly, the frame buffer banks FB1–FBM ultimately store frame buffer pixels for a desired display. At that time, the pixels are supplied through the FIFOs FO1–FOM, the display pixel MUX 60 (FIG. 9) and the D/A converter 62 to the display unit. The read out sequence from the FIFOs FO1–FOM typically is in a raster format with the consequence of driving the display unit 64 in a similar pattern. Accordingly, as well known in the computer graphic art, the digital pixel data is converted to an analog signal (converter 62) for driving the display unit 64.

In operation, the system as disclosed above attains parallelism for rapid rendering yet preserves temporal priority with the attendant residual data. Consequently, considerable volumes of data may be processed in short periods of time without loss of significance. Of course, various forms of components may be utilized in other embodiments and many variations also are possible without departing from the spirit of the invention. For example, substantial deviations are possible within the specific forms of structures as well as specific arrangements. Accordingly, the scope hereof should not be limited to the specific disclosure herein but rather should be determined by the claims.

What is claimed is:

1. A system for processing differing data sets as provided in temporal sequence to be processed as distinct packets, said system comprising:

a plurality of parallel processors, said processors being allowed differing processing operations on said differing data sets;

an output unit outputting said differing data sets in said temporal sequence;

a plurality of FIFOs coupled to said processors, a distinct FIFO being connected to one of said processors to allow independent operation of said one processor from remaining of said processors for accommodating said differing processing operations, said plurality of FIFOs being commonly coupled to said output unit; and control means for said differing data sets flowing through said processors and said FIFOs to preserve said temporal sequence.

2. A system for processing data sets as provided in temporal sequence to be processed as distinct packets, said system comprising:

an input unit presenting an input operation of substantially a first duration, said data sets being provided to said input unit in said temporal sequence;

a processor providing a processing operation of substantially a second duration;

a plurality of N parallel output units providing output operations of substantially a third duration, said third duration being relatively greater than said first and second durations;

a plurality of N FIFOs coupled to said processor and further coupled to said output units in a one-to-one correspondence as between a distinct FIFO and a distinct output unit to isolate said output units from each other for preserving said temporal sequence of said data sets in said output units; and control means for data sets flowing through said processor and said FIFOs to preserve said temporal sequence.

3. A system for processing data sets as provided in temporal sequence to be processed as distinct packets, said system comprising:

a plurality of N processors a coupled for parallel operation;

a plurality of M output units coupled for parallel operation;

an N×M array of FIFOs coupled to said processors and output units whereby a FIFO distinctly connects one of said processors to one of said output units allowing independent operation of said one output unit from said one processor and from remaining of said output units; and control means for data sets flowing through said processors, FIFOs and output units.

4. A system according to claim 3 wherein said processors comprise primitive processors, and said output units comprise visibility-and-blend processors.

5. A system according to claim 4 comprising N parallel primitive processors, M parallel visibility-and-blend processors and N×M FIFOs.

6. A system according to claim 5 wherein said control means preserves said data sets in temporal sequence.

7. A system for processing data sets as provided in temporal sequence to be processed as distinct packets, said system comprising:

a plurality of N processors coupled for parallel operation;

a plurality of M output units coupled for parallel operation;

an N×M array of FIFOs coupled to said processors and output units whereby a distinct one of said FIFOs connects one of said processors to one of said output units allowing independent operation of said one processor from said remaining of said processors and from said one output unit; and control means for data sets flowing through said processors and said FIFOs to preserve said temporal sequence.

8. A graphics system for processing primitive data, as provided in a temporal sequence from a host computer, to provide display data in the form of display pixels related to locations in a display, said graphics system comprising:

a primitive structure for processing said primitive data to provide representative update pixels and comprising a plurality of primitive processors for iteratively receiving and processing primitive data in parallel for individual primitives, whereby said temporal sequence is altered;

a plurality of visibility-and-blend pixel processors, said visibility-and-blend processors each comprising an associated frame buffer bank for storing predetermined pixels related to locations in a display, said visibility-and-blend processors each for iteratively processing said update pixels into said associated frame buffer bank;

a switch structure for supplying said update pixels from said primitive structure to said visibility-and-blend pixel processors in accordance with locations in a display; and a distribution structure for supplying said update pixels to said visibility-and-blend pixel processors in said temporal sequence.

9. A graphics system according to claim 8 wherein said primitive structure for processing said primitive data comprises means for scan converting said primitive data.

10. A graphics system according to claim 9 wherein said primitive structure for processing said primitive data further comprises means for shading said primitive data.

11. A graphics system according to claim 9 wherein said primitive processors receive primitive coherent data, said visibility-and-blend pixel processors receive screen space coherent data.

12. A graphics system according to claim 11 further comprising a display unit coupled to receive display sequence data.

13. A graphics system according to claim 8 wherein said visibility-and-blend pixel processors determine visibility between said update pixels and the content of said frame buffer bank to resolve contention.

14. A graphics system according to claim 8 wherein said visibility-and-blend pixel processors further comprise FIFOs for storing pixel data.

15. A graphics system according to claim 8 further comprising a display pixel multiplexer for receiving display pixels from said frame buffer banks to provide said display pixels in a display sequence.

16. A graphics system according to claim 15 wherein said display sequence is a raster pattern.

17. A graphics system according to claim 8 wherein each of said associated frame buffer banks stores display pixels for spaced apart locations in said display.

18. A graphics system according to claim 17 wherein said spaced apart locations are related to a raster scan pattern.

19. A method of parallel processing computer graphics object data specifying primitives to provide display data comprising the steps of:

receiving primitive data representative of primitives in a sequence of temporal priority;

scan converting said primitive data in a plurality of parallel operations to provide streams of update pixel data disordered with respect to said temporal priority;

storing said update pixel data for varying intervals to re-establish said temporal priority; and processing said update pixel data iteratively in a plurality of parallel operations to store frame buffer pixels as display data.

20. A method according to claim 19, further comprising a step of shading said primitive data.

21. A method according to claim 19, wherein said step of processing comprises a step of determining visibility between said update pixel data and said frame buffer pixels to resolve contention.

22. A method according to claim 19, wherein said step of scan converting scan-converts primitive-coherent primitive data.

23. A method according to claim 19, wherein said step of processing processes screen-coherent update pixel data.

24. A method system according to claim 19 further comprising a step of storing said frame buffer pixels as display data according to display locations.

25. A method according to claim 19 further comprising a step of tagging said update pixel data for preserving temporal priority.

26. A method according to claim 19, further comprising a step of sorting said primitive data from primitive-coherent streams to screen-coherent streams.

* * * * *